US012223765B2

(12) United States Patent
Senda

(10) Patent No.: US 12,223,765 B2
(45) Date of Patent: Feb. 11, 2025

(54) INFORMATION PROCESSING APPARATUS, INFORMATION PROCESSING METHOD AND STORAGE MEDIUM

(71) Applicant: NEC Corporation, Tokyo (JP)

(72) Inventor: Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 17/761,305

(22) PCT Filed: Sep. 27, 2019

(86) PCT No.: PCT/JP2019/038338
§ 371 (c)(1),
(2) Date: Mar. 17, 2022

(87) PCT Pub. No.: WO2021/059526
PCT Pub. Date: Apr. 1, 2021

(65) Prior Publication Data
US 2022/0343673 A1 Oct. 27, 2022

(51) Int. Cl.
G06V 10/00 (2022.01)
G06T 7/70 (2017.01)
G06V 40/16 (2022.01)
G08B 25/04 (2006.01)

(52) U.S. Cl.
CPC .............. *G06V 40/161* (2022.01); *G06T 7/70* (2017.01); *G06V 40/178* (2022.01); *G08B 25/04* (2013.01)

(58) Field of Classification Search
CPC .... G06V 20/52; G06V 40/161; G06V 40/178; G06T 7/70; G08B 25/04
See application file for complete search history.

(56) References Cited

U.S. PATENT DOCUMENTS

| 9,235,754 | B2 * | 1/2016 | Oami ..................... G06V 20/52 |
| 10,713,497 | B2 * | 7/2020 | Womack ................ G03B 21/62 |
| 10,896,520 | B2 * | 1/2021 | Zhao ......................... G06T 7/70 |
| 2002/0191819 | A1 | 12/2002 | Hashimoto et al. |
| 2013/0215275 | A1 | 8/2013 | Berini et al. |
| 2020/0118369 | A1 * | 4/2020 | Sakaguchi ......... G06Q 30/0271 |
| 2020/0143186 | A1 * | 5/2020 | Kato ....................... G06F 21/32 |
| 2020/0242851 | A1 | 7/2020 | Saikawa et al. |

(Continued)

FOREIGN PATENT DOCUMENTS

| JP | 2004-310197 A | 11/2004 |
| JP | 2008-040937 A | 2/2008 |

(Continued)

OTHER PUBLICATIONS

Extended European Search Report for EP Application No. EP19946509.7 dated on Sep. 9, 2022.

(Continued)

Primary Examiner — Amir Alavi
(74) Attorney, Agent, or Firm — Sughrue Mion, PLLC

(57) ABSTRACT

An information processing apparatus includes: an acquisition unit that acquires height information relating to a height of a capturing position of an imaging device that captured an image in which a face of a user was detected; and a determination unit that determines, based on the height information, whether or not the user is a candidate for person requiring assistance, who may be a person requiring assistance.

15 Claims, 34 Drawing Sheets

(56) References Cited

U.S. PATENT DOCUMENTS

| | | | |
|---|---|---|---|
| 2023/0087270 A1* | 3/2023 | Akutsu | G06Q 10/06 |
| | | | 705/7.11 |
| 2023/0113395 A1* | 4/2023 | Kawase | G07C 9/37 |
| | | | 726/16 |
| 2023/0120752 A1* | 4/2023 | Monden | G06V 40/10 |
| | | | 358/400 |
| 2023/0342451 A1* | 10/2023 | Okuyama | G06F 21/45 |
| 2024/0127626 A1* | 4/2024 | Takahashi | G06F 16/583 |
| 2024/0135480 A1* | 4/2024 | Norimatsu | G01N 23/04 |
| 2024/0153606 A1* | 5/2024 | Watanabe | G16H 20/13 |

FOREIGN PATENT DOCUMENTS

| | | |
|---|---|---|
| JP | 2010-238179 A | 10/2010 |
| JP | 2011-186788 A | 9/2011 |
| JP | 2014-241553 A | 12/2014 |
| JP | 2018-077740 A | 5/2018 |
| JP | 2018-109935 A | 7/2018 |
| JP | 2018-173693 A | 11/2018 |
| JP | 6440906 B | 12/2018 |
| WO | 02/056251 | 7/2002 |

OTHER PUBLICATIONS

International Search Report for PCT Application No. PCT/JP2019/038338, mailed on Nov. 19, 2019.

* cited by examiner

FIG. 2

| No | ITEM NAME |
|---|---|
| 1 | TOKEN ID |
| 2 | GROUP ID |
| 3 | FEATURE AMOUNT |
| 4 | REGISTERED FACE IMAGE |
| 5 | TOKEN ISSUE TIME |
| 6 | TOKEN ISSUE DEVICE NAME |
| 7 | INVALID FLAG |
| 8 | INVALIDATION TIME |

FIG. 3

| No | ITEM NAME |
|---|---|
| 1 | PASSING HISTORY ID |
| 2 | TOKEN ID |
| 3 | PASSING TIME |
| 4 | DEVICE NAME |
| 5 | BUSINESS SYSTEM TYPE |
| 6 | PASSING TOUCH POINT |

FIG. 4

| No | ITEM NAME |
|---|---|
| 1 | TOKEN ID |
| 2 | PASSENGER NAME |
| 3 | RESERVATION NUMBER |
| 4 | DEPARTURE PLACE |
| 5 | DESTINATION PLACE |
| 6 | AIRLINE CODE |
| 7 | FLIGHT NUMBER |
| 8 | OPERATION DATE |
| 9 | SEAT NUMBER |
| 10 | NATIONALITY |
| 11 | PASSPORT NUMBER |
| 12 | SURNAME |
| 13 | FIRST NAME |
| 14 | DATE OF BIRTH |
| 15 | SEX |
| 16 | FLAG OF PERSON REQUIRING ASSISTANCE |
| 17 | TYPE OF PERSON REQUIRING ASSISTANCE |

FIG. 5

| No | ITEM NAME |
|---|---|
| 1 | terminal ID |
| 2 | attendant ID |
| 3 | current position |

FIG. 6

| No | ITEM NAME |
|---|---|
| 1 | CANDIDATE ID |
| 2 | FACE IMAGE |
| 3 | FEATURE AMOUNT |
| 4 | TERMINAL ID |
| 5 | DETECTION TIME |

IF YOU REGISTER YOUR FACE IMAGE, THE
FOLLOWING PROCEDURES UNTIL DEPARTURE
CAN BE EASILY PERFORMED BY
FACE AUTHENTICATION.

- USE OF BAGGAGE DROP MACHINE
- SECURITY INSPECTION PROCEDURE
- DEPARTURE PROCEDURE AT AUTOMATED
  GATE APPARATUS
- BOARDING PROCEDURE AT BOARDING GATE

WOULD YOU LIKE TO TAKE A FACE IMAGE?

| YES | NO |

IF YOU REGISTER YOUR FACE IMAGE AND
FURTHER REGISTER YOUR CREDIT CARD
INFORMATION, YOU CAN USE THE PAYMENT
SERVICE BY FACE AUTHENTICATION IN THE PARK.

WOULD YOU LIKE TO REGISTER YOUR CREDIT
CARD INFORMATION?

| YES | NO |

INFORMATION PROCESSING APPARATUS, INFORMATION PROCESSING METHOD AND STORAGE MEDIUM

This application is a National Stage Entry of PCT/JP2019/038338 filed on Sep. 27, 2019, the contents of all of which are incorporated herein by reference, in their entirety.

TECHNICAL FIELD

The present invention relates to an information processing apparatus, an information processing method and a storage medium.

BACKGROUND ART

Patent Literature 1 discloses an apparatus having a function of detecting a wheelchair passenger. The apparatus disclosed in Patent Literature 1 specifies a face area of a passenger on the basis of an image captured by a television camera, detects a position of the face image on the image, and estimates an area on the image where a wheelchair is likely to exist if the passenger is riding on the wheelchair from the position of the face area. Further, the apparatus disclosed in Patent Literature 1 examines the estimated wheelchair presence area to determine whether a wheelchair is present.

CITATION LIST

Patent Literature

PTL 1: International Publication No. WO02/056251
PTL 2: Japanese Patent Application Laid-Open No. 2010-238179

SUMMARY OF INVENTION

Technical Problem

The apparatus described in Patent Literature 1 needs to perform image processing in order to determine the presence or absence of a wheelchair by estimating the wheelchair presence area from the position of the face area on the image. For this reason, it is difficult for the apparatus disclosed in Patent Literature 1 to accurately and efficiently find a possible candidate for person requiring assistance such as a wheelchair user.

In view of the above problems, it is an example object of the present invention to provide an information processing apparatus, an information processing method, and a storage medium capable of efficiently finding a possible candidate for person requiring assistance with high accuracy.

Solution to Problem

According to one example aspect of the present invention, there is provided an information processing apparatus including: an acquisition unit that acquires height information relating to a height of a capturing position of an imaging device that captured an image in which a face of a user was detected; and a determination unit that determines, based on the height information, whether or not the user is a candidate for person requiring assistance, who may be a person requiring assistance.

According to another example aspect of the present invention, there is provided an information processing method including: acquiring height information relating to a height of a capturing position of an imaging device that captured an image in which a face of a user was detected; and determining, based on the height information, whether or not the user is a candidate for person requiring assistance, who may be a person requiring assistance.

According to yet another example aspect of the present invention, there is provided a storage medium storing a program that causes a computer to perform: acquiring height information relating to a height of a capturing position of an imaging device that captured an image in which a face of a user was detected; and determining, based on the height information, whether or not the user is a candidate for person requiring assistance, who may be a person requiring assistance.

Advantageous Effects of Invention

According to the present invention, a candidate for person requiring assistance can be found with high accuracy and efficiency.

BRIEF DESCRIPTION OF DRAWINGS

FIG. 2 is a diagram illustrating an example of information stored in a token ID information database in the first example embodiment.

FIG. 3 is a diagram illustrating an example of information stored in a passing history information database in the first example embodiment.

FIG. 4 is a diagram illustrating an example of information stored in an operation information database in the first example embodiment.

FIG. 5 is a diagram illustrating an example of information stored in an attendant terminal information database in the first example embodiment.

FIG. 6 is a diagram illustrating an example of information stored in a candidate information database for persons requiring assistance in the first example embodiment.

FIG. 21 is a diagram illustrating an example of a screen displayed on the check-in terminal in the first example embodiment.

FIG. 31 is a diagram illustrating an example of a screen displayed on the automatic ticket vending machine in the second example embodiment.

DESCRIPTION OF EMBODIMENTS

Figure 1:
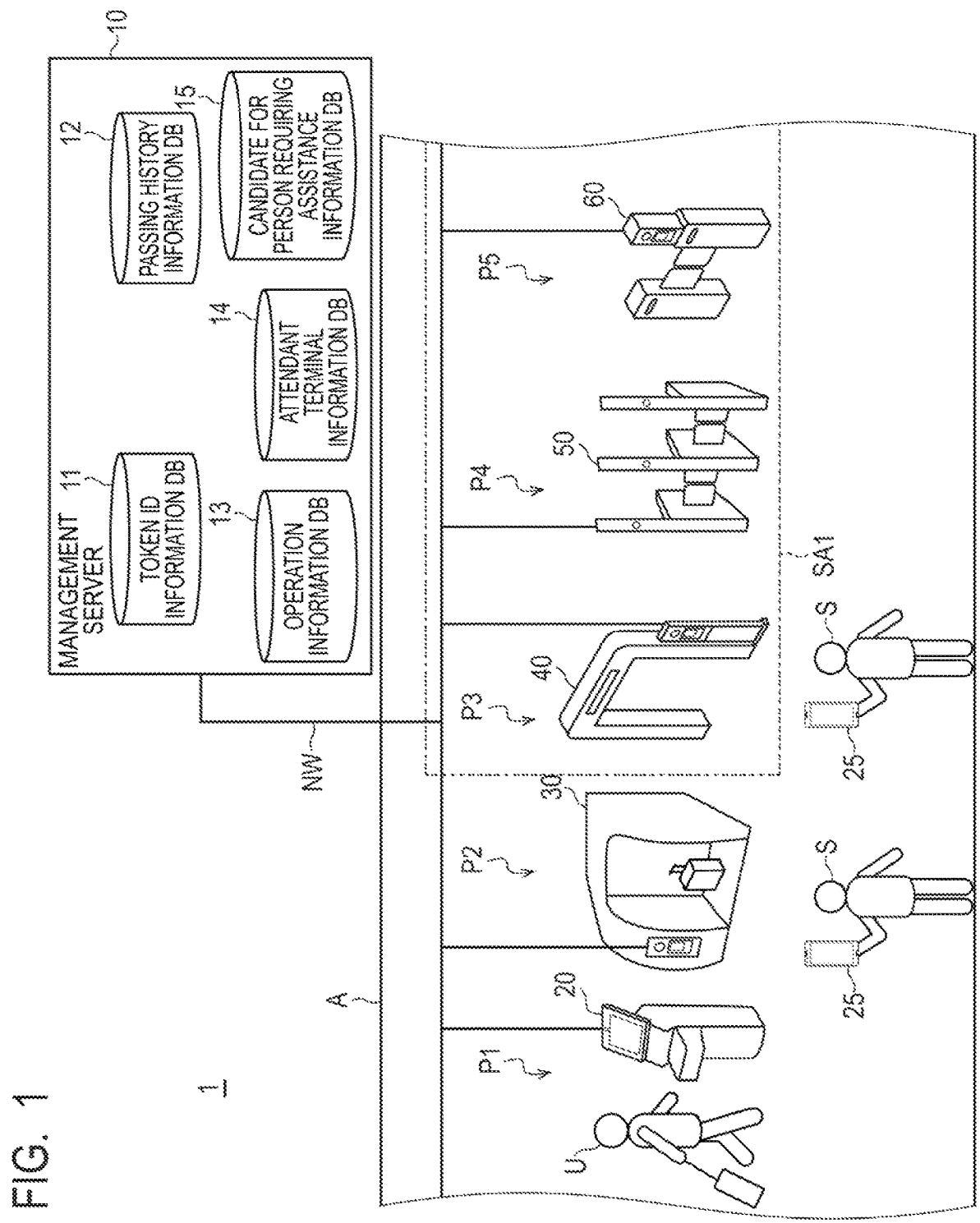
FIG. 1 is a block diagram illustrating an example of the overall configuration of an information processing system in a first example embodiment.

Example embodiments of the present invention will now be described with reference to the drawings. In the drawings, the same elements or corresponding elements are denoted by the same reference numerals, and their description may be omitted or simplified.

First Example Embodiment

FIG. 1 is a block diagram illustrating an example of an overall configuration of an information processing system 1 in the present example embodiment. The information processing system 1 is a computer system for assisting a service related to a series of examination procedures for a user (passenger) U departing from an airport A of a first country to a second country by an aircraft. The information processing system 1 is operated, for example, by a public organization such as an immigration administration bureau or a trustee entrusted with business by the organization.

Furthermore, the information processing system 1 of the present example embodiment detects a person who may be a person requiring assistance from among the users U, and notifies an attendant S of an alarm indicating the detection. A person requiring assistance is a person who needs assistance of others in performing an act, such as a wheelchair user who uses a wheelchair, a child, or the like. The age range of a child to be treated as a person requiring assistance may be set to a prescribed age range according to the contents of procedures, for example, 12 years or younger, 15 years or younger, or the like. In addition, the attendant S is a person engaged in or involved in the duties of the administration bureau, airlines, airports, or the like, such as, for example, an employee of the administration bureau, an employee of an airline company, an employee of an airport company, or the like. In the following, a person who may be a person requiring assistance is appropriately referred to as a candidate for person requiring assistance. In addition, a person who is not a person requiring assistance, that is, a person who does not require assistance of others in performing an act, is appropriately referred to as a person who does not require assistance.

In the information processing system 1 of the present example embodiment, a check-in terminal 20, an attendant terminal 25, an automated baggage drop machine 30, a security inspection apparatus 40, an automated gate apparatus 50, and a boarding gate apparatus 60 are respectively connected to a common management server 10 via a network NW. The security inspection apparatus 40, the automated gate apparatus 50, and the boarding gate apparatus 60 are installed in a security area SA1 indicated by a broken line. The attendant terminal 25 is carried and used by the attendant S or installed in a predetermined place and used by the attendant S. The network NW is composed of a LAN (Local Area Network) including the private communication network of the airport A, a WAN (Wide Area Network), a mobile communication network and the like. The connection system is not limited to a wired system, but may be a wireless system. Note that in FIG. 1, for convenience of explanation, only terminal apparatuses (business terminals) used for procedures at the time of departure at the airport A are shown.

The management server 10 is an information processing apparatus for managing the operations related to the examination procedure at the time of entry and departure of the user U. The management server 10 manages the operation related to the examination procedure, detects a candidate for person requiring assistance, and notifies an alarm indicating the detection of the candidate for person requiring assistance. The management server 10 is installed, for example, in a facility of an airport company operating the airport A, an airline company, or the like. The management server 10 may be a cloud server instead of a server installed in a facility where the operation is actually performed. The management server 10 need not be a single server, but may be a group of servers including a plurality of servers. In addition, as illustrated in FIG. 1, the examination procedure at the time of departure at the airport A is sequentially performed at five touch points P1 to P5. Hereinafter, the relationship between each apparatus and the touch points P1 to P5 will be described. In the case of the present example embodiment, the description will be given of a case in which a candidate for person requiring assistance is detected using a face image captured by the check-in terminal 20 installed at the touch point P1. However, the face images captured by the automated baggage drop machine 30, the security inspection apparatus 40, the automated gate apparatus 50, and the boarding gate apparatus 60 installed at the other touch points P2 to P5 can also be used to detect a candidate for person requiring assistance in the same manner.

The check-in terminal 20 is installed in a check-in lobby (Hereinafter referred to as "touch point P1") in the airport A. The check-in terminal 20 is a self-terminal for the user U to perform the check-in procedure by himself or herself. The check-in procedure is a procedure for registering information for identifying the user U who is scheduled to board the aircraft. When the user U completes the procedure at the touch point P1, the user U moves to a baggage counter or a security inspection area.

The attendant terminal 25 is an information processing terminal used by the attendant S in charge of a predetermined operation in the airport A. The attendant terminal 25 is, for example, a portable terminal carried and used by the attendant S. The attendant terminal 25 may be, for example, a stationary terminal installed in a counter, office, or the like and used by the attendant S.

The automated baggage drop machine 30 is installed at the baggage counter (Hereinafter referred to as "touch point P2") in the airport A. The automated baggage drop machine 30 is a self-terminal for the user U to perform a procedure (baggage drop procedure) for checking the baggage which is not brought into the aircraft by the user U's own operation. When the user U completes the procedure at the touch point P2, the user U moves to the safety inspection area. If the user U does not check baggage, the procedure at the touch point P2 is omitted.

The security inspection apparatus 40 is installed at the security inspection area (Hereinafter referred to as "touch point P3") in the airport A. The security inspection apparatus 40 is an apparatus for confirming whether or not the user U is wearing metals which can be dangerous objects by a metal detector. The security inspection apparatus 40 includes, in addition to the metal detector, an X-ray inspection apparatus or the like for confirming the presence or absence of a dangerous object in a carry-on baggage or the like using X-rays. The user U who has completed the check-in procedure and the automated baggage drop procedure is subjected to the security inspection procedure by the security inspection apparatus 40 at the security inspection area. When the user U completes the procedure at the touch point P3, the user U moves to a departure examination area.

The automated gate apparatus 50 is installed in the departure examination area (Hereinafter referred to as "touch point P4") in the airport A. The automated gate apparatus 50 is an apparatus for automatically performing the departure examination procedure of the user U. When the user U completes the procedure at the touch point P4, the user U moves to a departure area where duty free shops and boarding gates are installed.

The boarding gate apparatus 60 is a passage control apparatus installed for each boarding gate (Hereinafter referred to as "touch point P5") in the departure area. The boarding gate apparatus 60 confirms that the user U is a passenger of the aircraft capable of boarding from the boarding gate. Upon completing the procedure at the touch point P5, the user U boards the aircraft and departs from the country.

As illustrated in FIG. 1, the management server 10 includes a token ID information DB 11, a passing history information DB 12, an operation information DB 13, an attendant terminal information DB 14, and a candidate for person requiring assistance information DB 15. Note that the databases of the management server 10 are not limited to these databases.

FIG. 2 is a diagram illustrating an example of information stored in the token ID information DB 11. The token ID information DB 11 uses a token ID, a group ID, a feature amount, a registered face image, a token issue time, a token issue device name, an invalid flag, and an invalidation time as data items. The token ID is an identifier for uniquely identifying the ID information. In the present example embodiment, the token ID is issued temporarily on condition that the matching result of the passport face image read from the passport at the touch point P1 matches the face image of the user U holding the passport. When the user U finishes the procedure at the touch point P5 (the boarding gate), the token ID is invalidated. That is, the token ID is a one-time ID having a valid period (life cycle).

The group ID is an identifier for grouping the ID information. The feature amount is a value extracted from the biometric information. The registered face image is a face image registered for the user U. The term "biometric information" in the present example embodiment means a face image and a feature amount extracted from the face image, but the biometric information is not limited to the face image and the face feature amount. That is, the biometric authentication may be performed using a fingerprint image, a palm print image, an auricle image, an iris image, or the like as the biometric information of the user U.

The token issue time is the time when the management server 10 issues the token ID. The token issuing device name is the device name of the acquisition source of the registered face image that triggered the issuance of the token ID. The invalid flag is flag information indicating whether or not the token ID is valid at the present time. The invalid flag becomes a value of "1" indicating the valid state of the token ID when the token ID is issued. When a predetermined condition is satisfied, the invalid flag is updated to a value of "0" indicating that the token ID is invalid. The invalidation time is the time stamp when the invalidation flag is invalidated.

FIG. 3 is a diagram illustrating an example of information stored in the passing history information DB 12. The passing history information DB 12 uses a passing history ID, the token ID, a passing time, a device name, a business system type, and a passing touch point as data items. The passing history ID is an identifier for uniquely identifying passing history information. The passing time is a time stamp when the touch point is passed. The device name is the machine name of the business terminal used for the procedure at the touch point. The business system type is the type of business system to which the business terminal belongs. The passing touch point is the name of the passing touch point. The management server 10 extracts the passing history information for each token ID, so that the management server 10 can grasp to which touch point the user U has been completed the procedure.

FIG. 4 is a diagram illustrating an example of information stored in the operation information DB 13. The operation information DB 13 uses the token ID, a passenger name, a reservation number, a departure place, a destination place, an airline code, a flight number, an operation date, a seat number, nationality, a passport number, surname, first name, date of birth, sex, a flag of person requiring assistance, and a type of person requiring assistance as data items. In this manner, the operation information DB 13 stores operation information related to a predetermined operation for each token ID. In the present example embodiment, "prescribed operation" means procedural operation performed at touch points P1 to P5, respectively.

The reservation number is an identifier for uniquely identifying the reservation information of the boarding pass. The airline code is an identifier for uniquely identifying the airline. Information such as the passenger name, the reservation number, the departure place, the destination place, the airline code, the flight number, the operation date, the seat number, the nationality, the passport number, the surname, the first name, the date of birth, and the sex can be obtained from media such as the passport and the boarding pass, or from a database (not shown) that manages the reservation information, using the passport number or the reservation number as a key.

The flag of person requiring assistance is flag information indicating whether or not the user U is a person requiring assistance. The flag of person requiring assistance is set to a value of "1" indicating that the user U is a person requiring assistance when it is confirmed that the user U is a person requiring assistance. Further, the flag of person requiring assistance is set to a value of "0" indicating that the user U is a person who does not require assistance when it is confirmed that the user U is a person who does not require assistance. The type of person requiring assistance is a specific type of person requiring assistance such as a wheelchair user, a child or the like when the user U is a person requiring assistance.

FIG. 5 is a diagram illustrating an example of information stored in the attendant terminal information DB 14. The attendant terminal information DB 14 uses a terminal ID, an attendant ID and a current position as data items. The terminal ID is an identifier for uniquely identifying the attendant terminal 25. The attendant ID is an identifier for uniquely identifying the attendant S using the attendant terminal 25. The current position is the current position of the attendant terminal 25 transmitted from the attendant terminal 25 to the management server 10 regularly or irregularly and registered when the attendant terminal 25 is a portable terminal, and the position of an installation place registered in advance when the attendant terminal 25 is a stationary terminal. The management server 10 can identify the current positions of the plurality of attendant terminals 25 in the airport A by referring to the current positions of the attendant terminal information DB 14.

FIG. 6 is a diagram illustrating an example of information stored in the candidate for person requiring assistance information DB 15. The candidate for person requiring assistance information DB 15 uses a candidate ID, a face image, a feature amount, a terminal ID, and a detection time as data items. The candidate ID is an identifier for uniquely identifying a candidate for person requiring assistance. The face image is a face image of a candidate for person requiring assistance. The feature amount is a value extracted from the face image. The terminal ID is an identifier for uniquely identifying each device such as the check-in terminal 20 that has detected the face image of the candidate for person requiring assistance. The detection time is the time when the face image of the candidate for person requiring assistance is detected. When the management server 10 detects a candidate for person requiring assistance, the management server 10 registers the candidate for person requiring assistance information in the candidate for person requiring assistance information DB 15 until the attendant S confirms whether the candidate for person requiring assistance is a person requiring assistance or not.

Next, a hardware configuration example of each of the apparatuses constituting the information processing system 1 will be described with reference to FIGS. 7 to 15. In FIG. 7 to FIG. 15, the apparatuses having the same name and different symbols are apparatuses having the same functions, and therefore, detailed descriptions thereof will be omitted in subsequent drawings.

Figure 7:
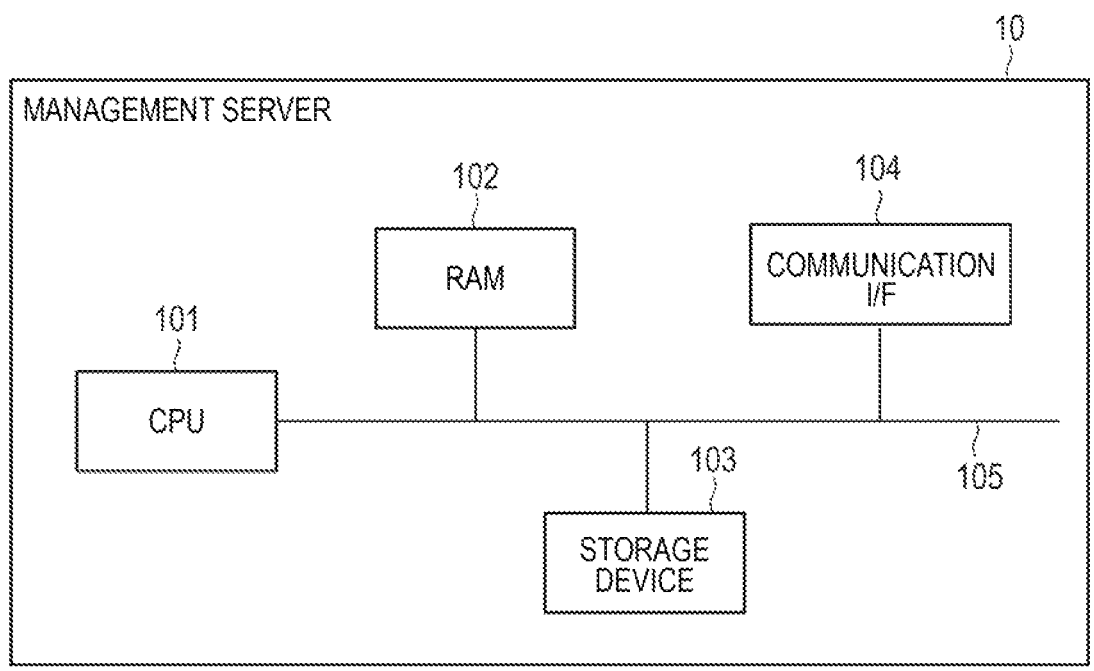
FIG. 7 is a block diagram illustrating an example of a hardware configuration of a management server in the first example embodiment.

FIG. 7 is a block diagram illustrating an example of the hardware configuration of the management server 10. As illustrated in FIG. 7, the management server 10 includes a CPU (Central Processing Unit) 101, a RAM (Random Access Memory) 102, a storage device 103, and a communication I/F 104. Each device is connected to a bus line 105.

The CPU 101 is a processor that performs a predetermined operation according to a program stored in the storage device 103 and has a function of controlling each part of the management server 10. In the management server 10, the CPU 101 functions as an acquisition unit, a registration unit, an issuance unit, a control unit, a matching unit, a determination unit, a notification unit, and an output unit. The RAM 102 comprises a volatile storage medium and provides a temporary memory area necessary for the operation of the CPU 101.

The storage device 103 is constituted of a storage medium such as a nonvolatile memory, a hard disk drive, or the like and functions as a storage unit. The storage device 103 stores programs executed by the CPU 101, data referred to by the CPU 101 when the programs are executed, and the like. In the present example embodiment, the token ID information DB 11 or the like corresponds to a storage unit.

The communication I/F 104 is a communication interface based on a standard such as Ethernet (registered trademark), Wi-Fi (registered trademark), 4G, or the like, and is a module for communicating with the check-in terminal 20 and the like.

Figure 8:
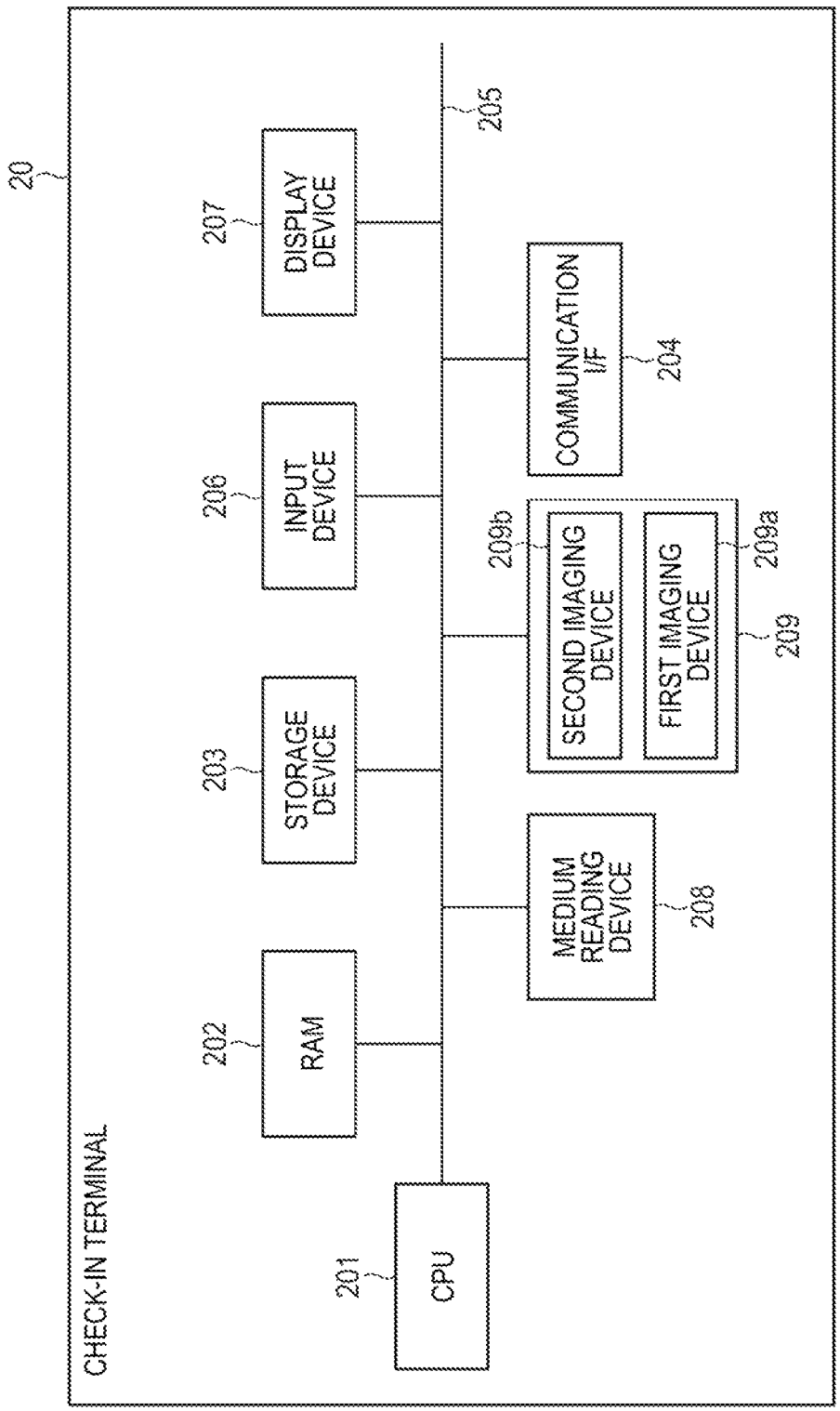
FIG. 8 is a block diagram illustrating an example of a hardware configuration of a check-in terminal in the first example embodiment.

FIG. 8 is a block diagram illustrating an example of the hardware configuration of the check-in terminal 20. As illustrated in FIG. 8, the check-in terminal 20 includes a CPU 201, a RAM 202, a storage device 203, a communication I/F 204, an input device 206, a display device 207, a medium reading device 208, and an imaging device 209. Each device is connected to a bus line 205.

The input device 206 is, for example, a pointing device such as a touch panel or the like, a keyboard, or the like. In the check-in terminal 20 of the present example embodiment, the display device 207 and the input device 206 are integrally formed as a touch panel. The display device 207 is a liquid crystal display device, an OLED (Organic Light Emitting Diode) display device, or the like, and is used for displaying moving images, still images, characters, or the like.

The medium reading device 208 reads the passport and the air ticket medium of the user U and acquires information recorded in the passport and the air ticket. Examples of the air ticket medium include a paper air ticket, a portable terminal for displaying a copy of an e-ticket, and the like. The medium reading device 208 includes, for example, a code reader, an image scanner, a contactless IC (Integrated Circuit) reader, an OCR (Optical Character Reader) device, or the like, and acquires information from various media held over its reading unit.

The imaging device 209 acquires a face image of the user U as biometric information of the user U. The imaging device 209 includes a first imaging device 209a and a second imaging device 209b having different heights from the floor surface to the installation position. Each of the first imaging device 209a and the second imaging device 209b is, for example, a digital camera for capturing the face of the user U located in front of the check-in terminal 20, and acquires the face image by capturing the face of the user U. The height from a certain reference position to the installation position may be used instead of the height from the floor surface to the installation position.

Figure 9:
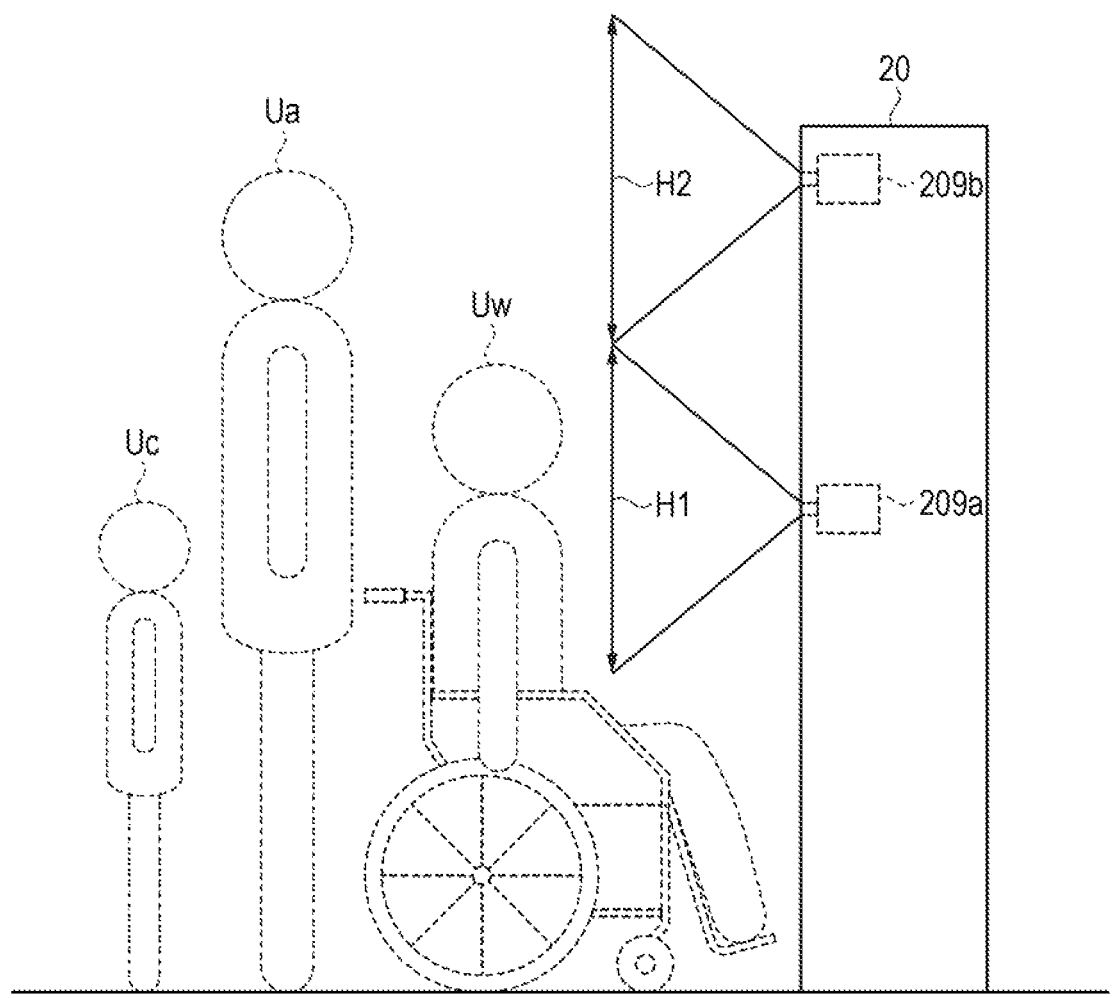
FIG. 9 is a diagram illustrating an example of an imaging device of the check-in terminal in the first example embodiment.

FIG. 9 is a diagram illustrating an example of the imaging device 209 of the check-in terminal 20. As illustrated in FIG. 9, the first imaging device 209a is disposed at a lower position than the second imaging device 209b. The first imaging device 209a and the second imaging device 209b have different capturing ranges in the vertical direction within a predetermined distance before the check-in terminal 20. That is, within a predetermined distance before the check-in terminal 20, the capturing range H1 in the vertical direction of the first imaging device 209a is lower than the capturing range H2 in the vertical direction of the second imaging device 209b (For example, the height from the floor surface to the lower end of the capturing range H1 is lower than the height from the floor surface to the lower end of the capturing range H2).

The capturing range H1 of the first imaging device 209a is set to a predetermined height or less so that the faces of the wheelchair user Uw and the child Uc having a predetermined height or less can be captured by the first imaging device 209a among the users U. The capturing range H1 can be appropriately set, but is set based on factors such as the average sitting height when using a wheelchair and the average height of a child in a predetermined age range to be treated as a person requiring assistance.

On the other hand, the capturing range H2 of the second imaging device 209b is set at a position higher than a predetermined height so that the face of an adult Ua exceeding a predetermined height among the users U can be captured by the second imaging device 209b. Note that the capturing range H1 and the capturing range H2 may have overlapping portions.

The check-in terminal 20 acquires height information. The height information is information relating to the height of the capturing position of the imaging device. For example, in accordance with whether the face image of the user U is captured by the first imaging device 209a or the second imaging device 209b, specific numerical information indicating the height of the installation position of the first imaging device 209a or the second imaging device 209b capturing the face image of the user U is acquired as the height information. Also, acquiring the identification information of the imaging device is included in acquiring the height information.

Figure 10:
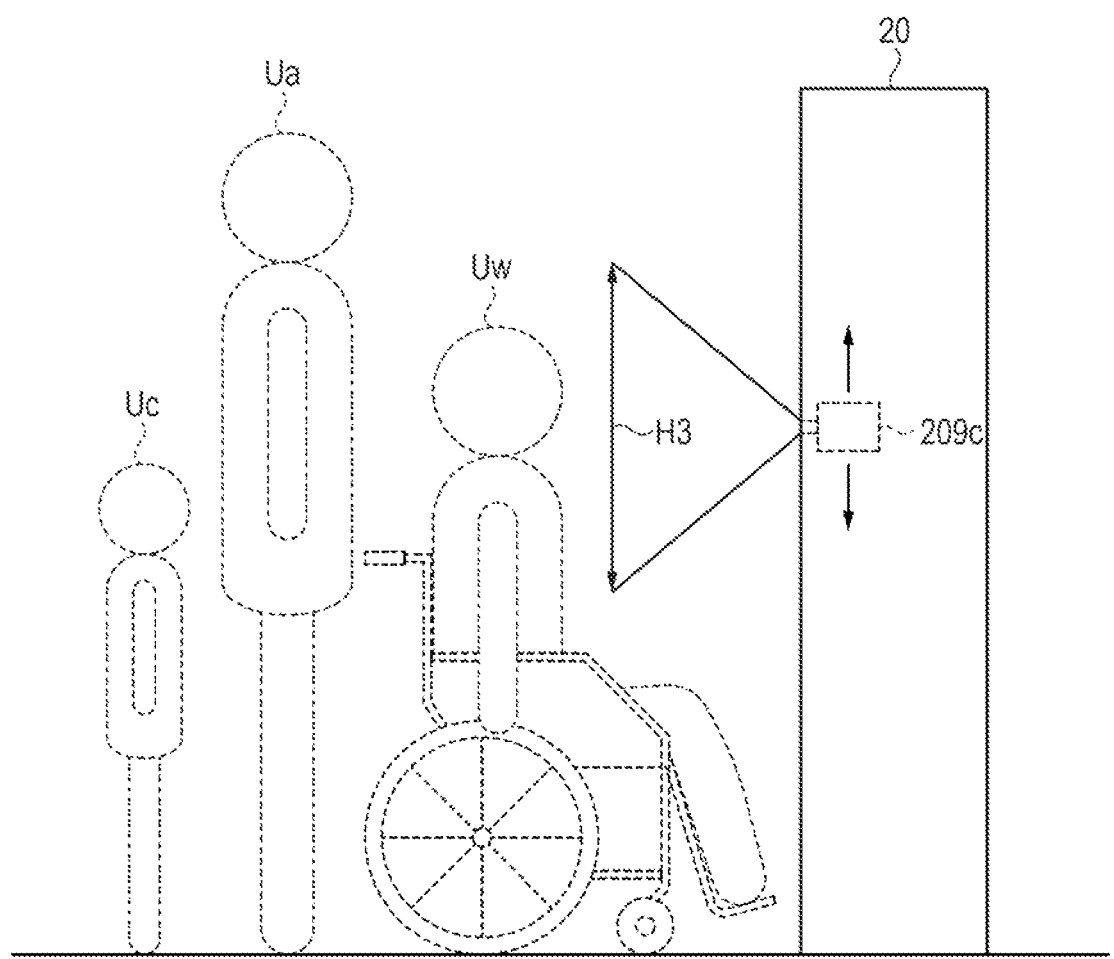
FIG. 10 is a diagram illustrating another example of an imaging device of the check-in terminal in the first example embodiment.

The imaging device 209 is not limited to those including the first imaging device 209a and the second imaging device 209b. FIG. 10 illustrates another example of the imaging device 209 of the check-in terminal 20. As illustrated in FIG. 1, the imaging device 209 may be constituted by a single imaging device 209c movable up and down. The imaging device 209c can move up and down to change the height. By changing the height of the imaging device 209c, the capturing range H3 in the vertical direction can be changed vertically within a predetermined distance before the check-in terminal 20. In this case, height information based on the position (capturing position) after the movement of the imaging device 209c can be acquired. When the initial position of the imaging device 209c is determined, acquiring the amount of movement from the initial position is also included in acquiring the height information.

The imaging device 209c can set the capturing range H3 to a predetermined height or less so as to capture the faces of the wheelchair user Uw and the child Uc having a predetermined height or less among the users U. Further, the imaging device 209c can set the capturing range H3 higher than the predetermined height so as to capture the face of the adult Ua exceeding the predetermined height among the users U. The imaging device 209b can capture the face of the user U by appropriately changing the capturing range H3.

Figure 11:
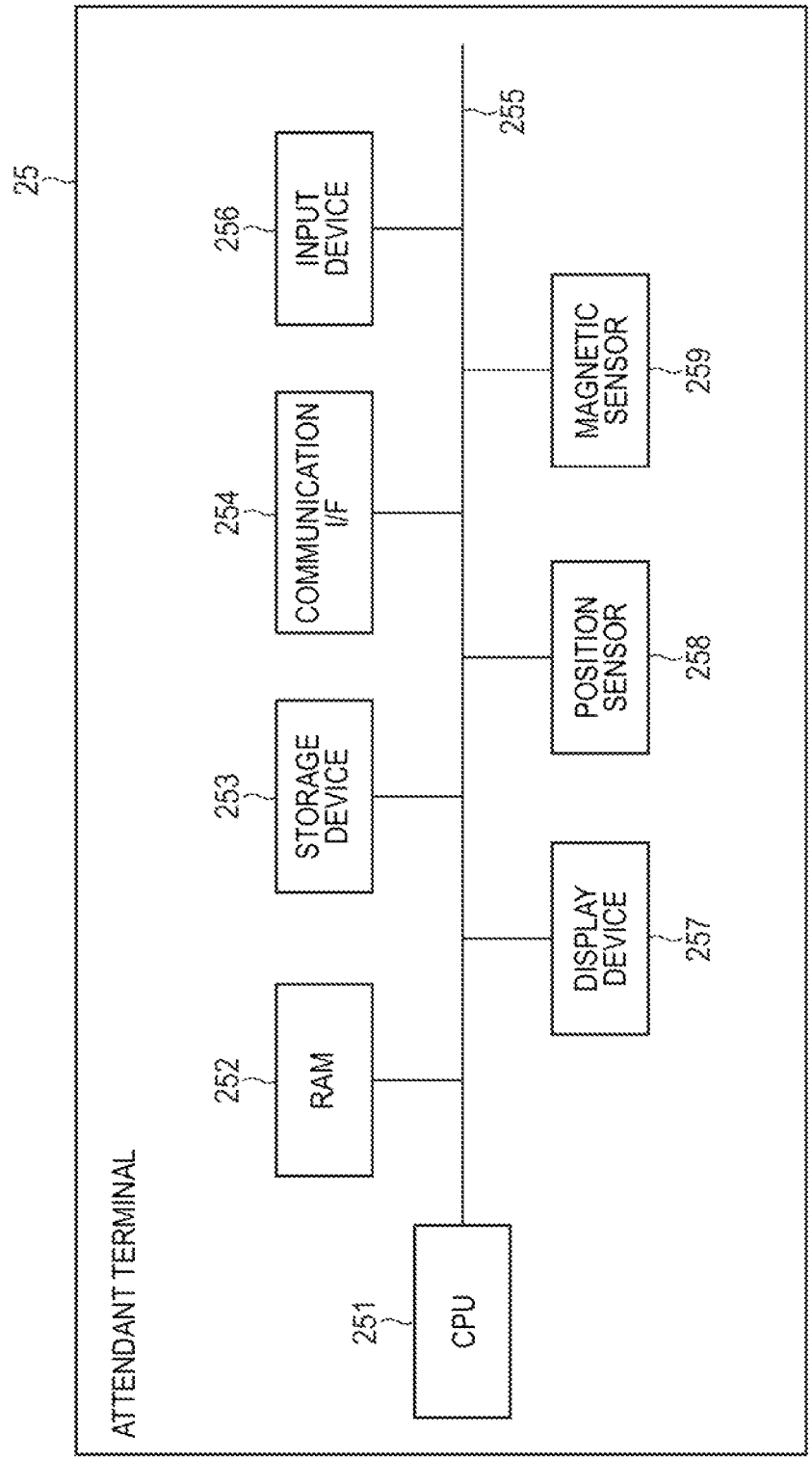
FIG. 11 is a block diagram illustrating an example of a hardware configuration of an attendant terminal in the first example embodiment.

FIG. 11 is a block diagram illustrating an example of the hardware configuration of the attendant terminal 25. As illustrated in the figure, the attendant terminal 25 includes a CPU 251, a RAM 252, a storage device 253, a communication I/F 254, an input device 256, a display device 257, a position sensor 258, and a magnetic sensor 259. Each device is connected to a bus line 255.

The position sensor 258 uses GNSS (Global Navigation Satellite System) to position the current position of the attendant terminal 25. Thus, the position sensor 258 acquires position information indicating the current position of the attendant terminal 25. The GNSS is not particularly limited, and for example, Global Positioning System (GPS), Global Navigation Satellite System (GLONASS), Galileo, Compass, or the like.

The magnetic sensor 259 detects geomagnetism at the present position of the attendant terminal 25 to acquire geomagnetic information. The magnetic sensor 259 detects geomagnetism by using, for example, a Hall element, a magnetoresistive element, a magnetic impedance element, or the like, although it is not particularly limited. The attendant terminal 25 can acquire position information indicating the present indoor position of the attendant terminal 25 based on the geomagnetic information acquired by the magnetic sensor 259 in addition to the position information acquired by the position sensor 258.

Further, the attendant terminal 25 can acquire, in addition to the position information obtained by the magnetic sensor 259, position information indicating the indoor current position of the attendant terminal 25 by, for example, Wi-Fi positioning, beacon positioning or the like.

Figure 12:
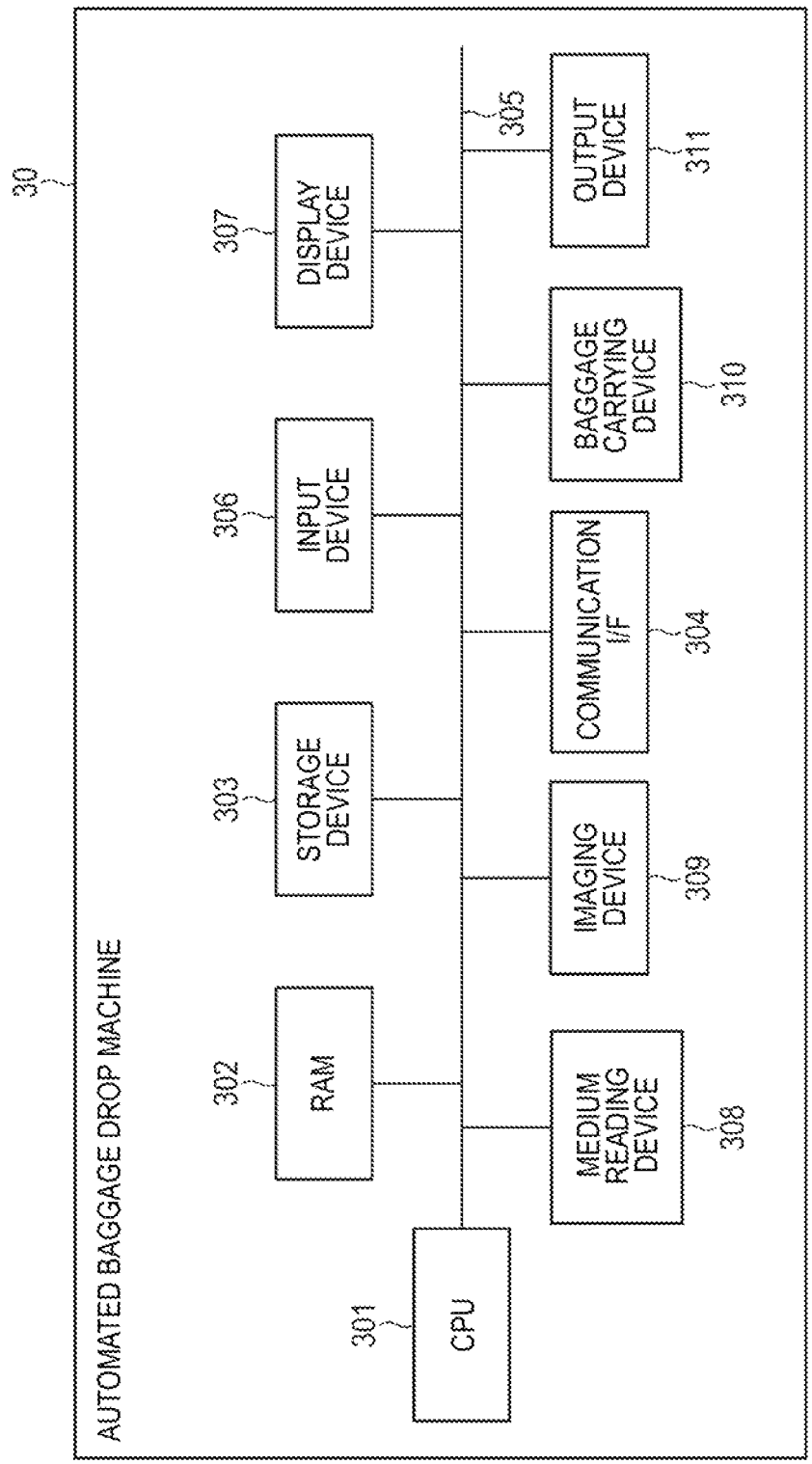
FIG. 12 is a block diagram illustrating an example of a hardware configuration of an automated baggage drop machine in the first example embodiment.

FIG. 12 is a block diagram illustrating an example of the hardware configuration of the automated baggage drop machine 30. As illustrated in FIG. 12, the automated baggage drop machine 30 includes a CPU 301, a RAM 302, a storage device 303, a communication I/F 304, an input device 306, a display device 307, a medium reading device 308, an imaging device 309, a baggage carrying device 310, and an output device 311. Each device is connected to a bus line 305.

When the identification of the user U is successfully confirmed, the baggage carrying device 310 carries the baggage to load the baggage onto the aircraft on which the user U boards. The baggage carrying device 310 carries the baggage placed in the receiving part by the user U and tagged with the baggage tag toward the freight handling.

The output device 311 outputs a baggage tag to be attached to a checked baggage. The output device 311 also outputs a baggage claim tag required for the exchange of the baggage after arriving at the destination place. The baggage tag and the baggage claim tag are associated with at least one of the passport information and the boarding information.

Figure 13:
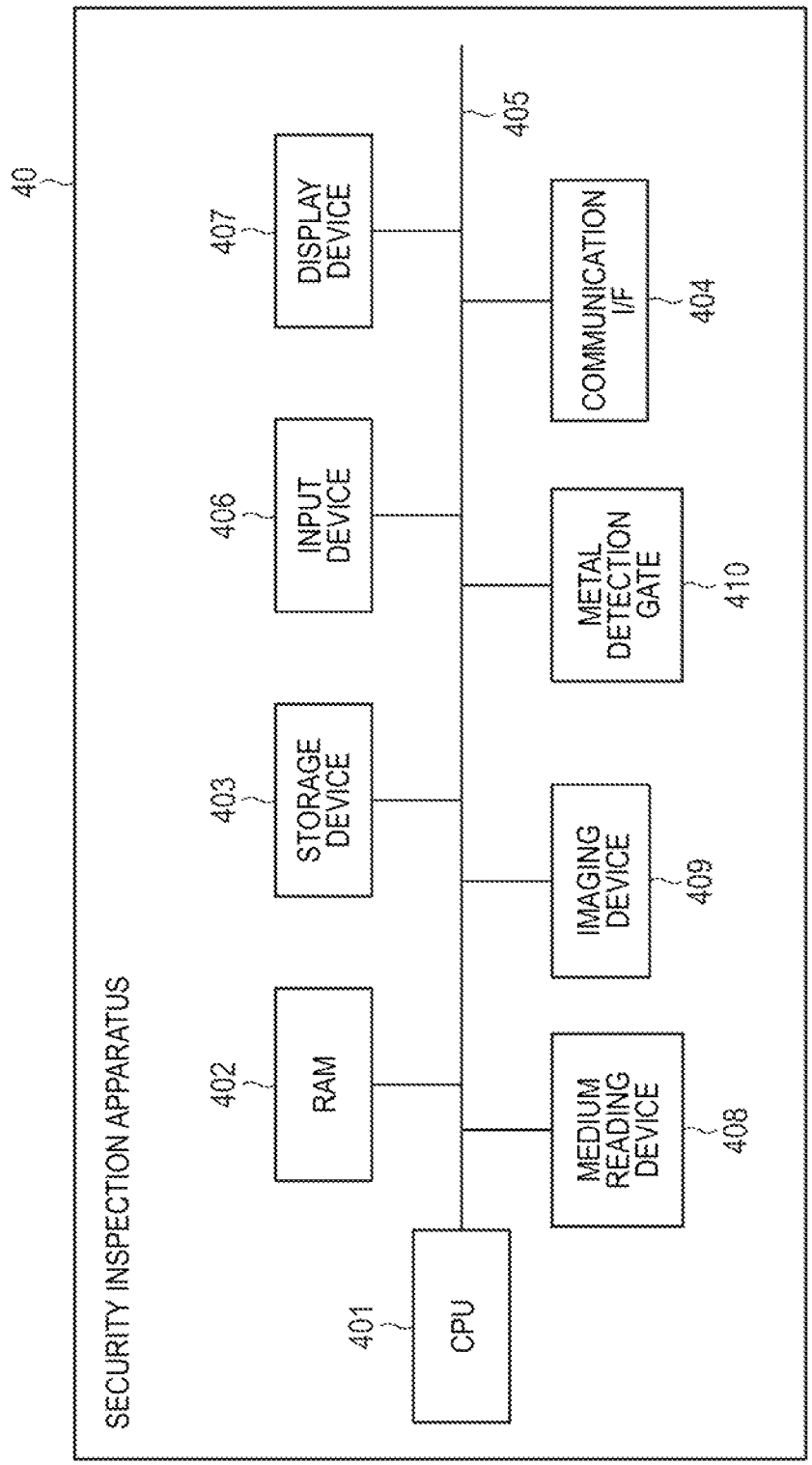
FIG. 13 is a block diagram illustrating an example of a hardware configuration of a security inspection apparatus in the first example embodiment.

FIG. 13 is a block diagram illustrating an example of the hardware configuration of the security inspection apparatus 40. As illustrated in FIG. 13, the security inspection apparatus 40 includes a CPU 401, a RAM 402, a storage device 403, a communication I/F 404, an input device 406, a display device 407, a medium reading device 408, an imaging device 409, and a metal detection gate 410. Each device is connected to a bus line 405.

The metal detection gate 410 is a gate-type metal detector and detects metals worn by the user U passing through the metal detection gate 410.

Figure 14:
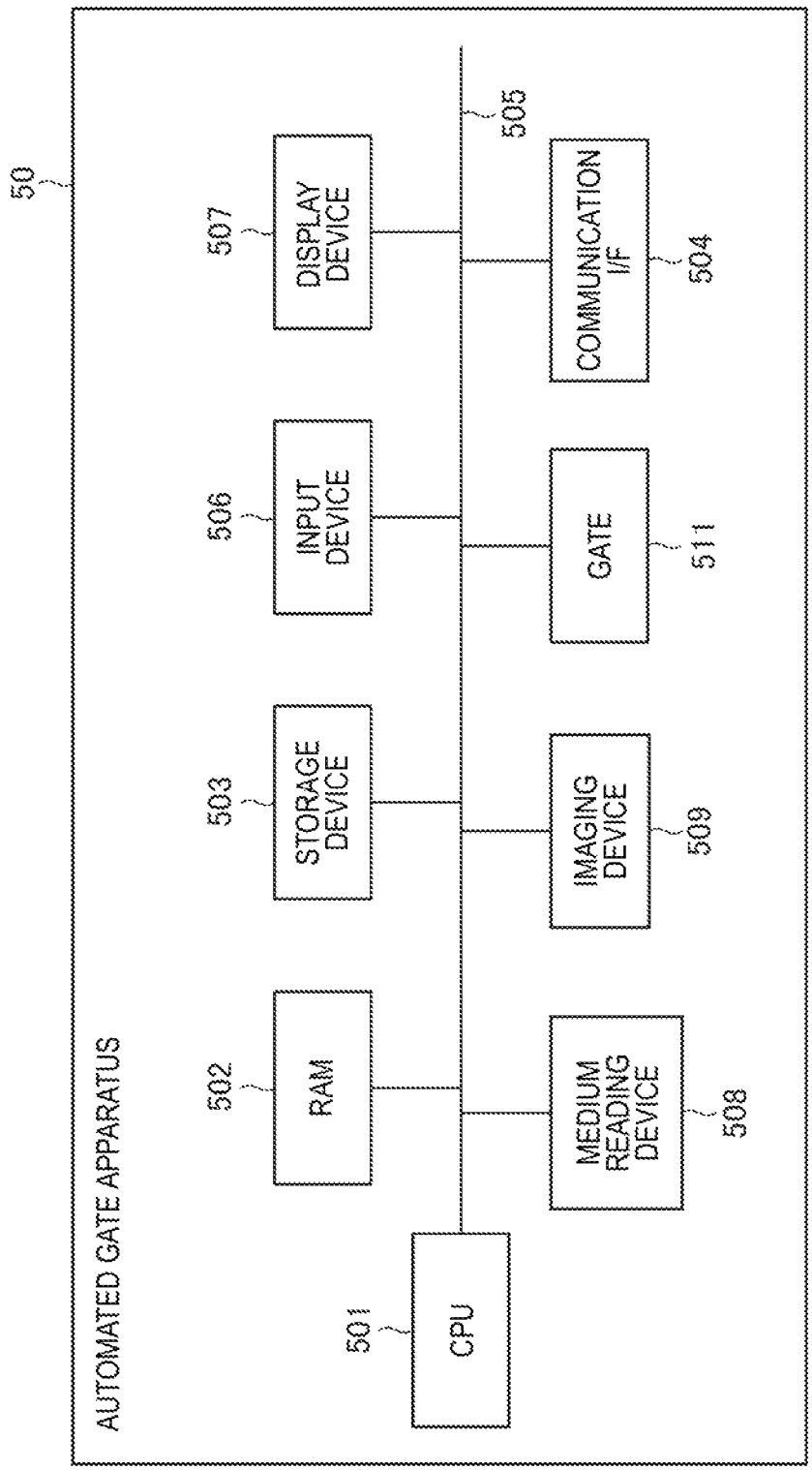
FIG. 14 is a block diagram illustrating an example of a hardware configuration of an automated gate apparatus in the first example embodiment.

FIG. 14 is a block diagram illustrating an example of the hardware configuration of the automated gate apparatus 50. The automated gate apparatus 50 includes a CPU 501, a RAM 502, a storage device 503, a communication I/F 504, an input device 506, a display device 507, a medium reading device 508, an imaging device 509, and a gate 511. Each device is connected to a bus line 505. The automated gate apparatus 50 disposed at the immigration examination area has the same hardware configuration as the automated gate apparatus 50 disposed at the departure examination area.

When the user U passes the departure examination after the identification of the user U in the automated gate apparatus 50 is successful, the gate 511 shifts from a closed state blocking the passage of the user U in standby to an open state permitting the passage of the user U in accordance with the control by the CPU 501. The type of the gate 511 is not particularly limited, and for example, a flapper gate a flapper of which provided from one side or both sides of the passage opens and closes, a turnstile gate in which 3 bars rotate, or the like.

Figure 15:
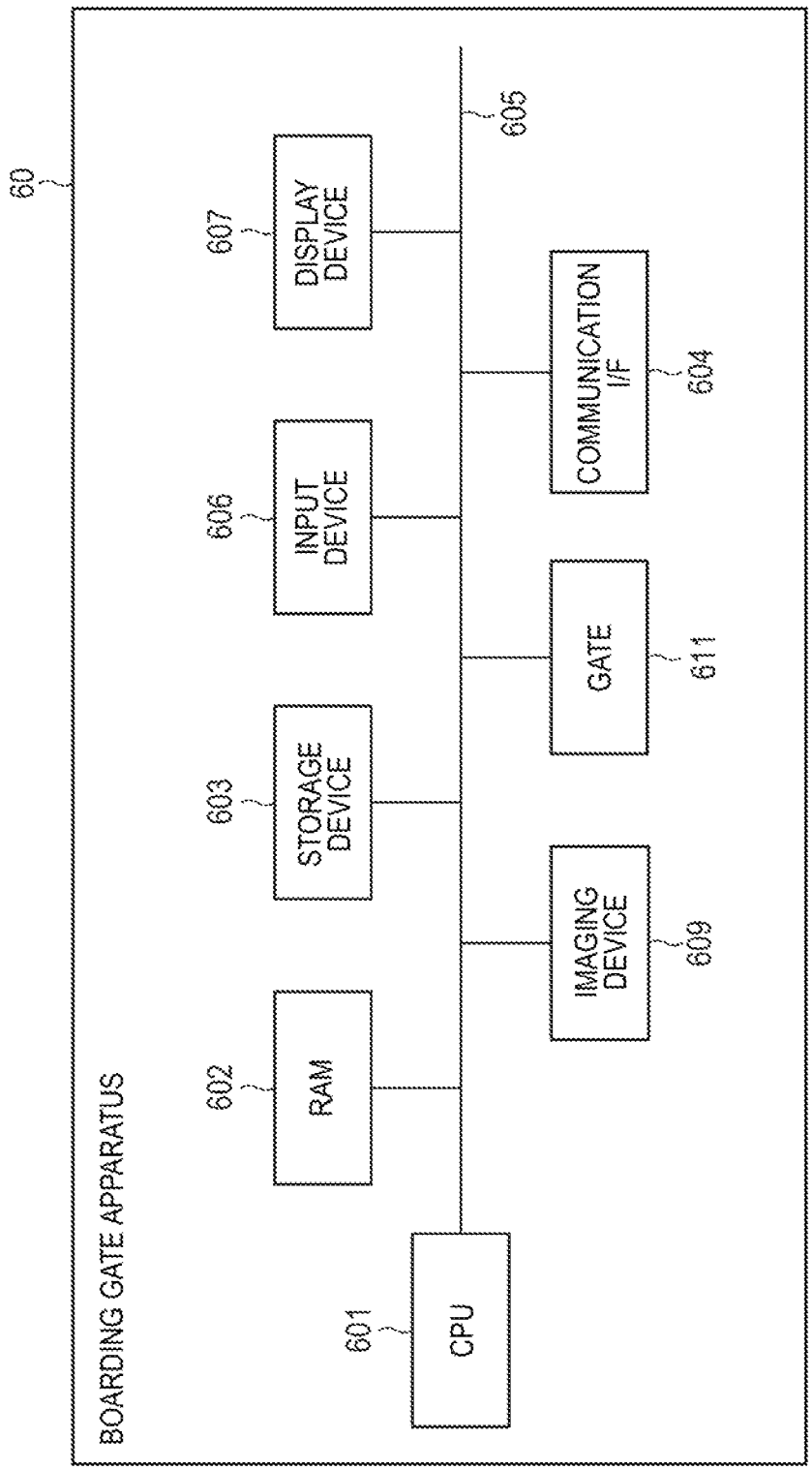
FIG. 15 is a block diagram illustrating an example of a hardware configuration of a boarding gate apparatus in the first example embodiment.

FIG. 15 is a block diagram illustrating an example of the hardware configuration of the boarding gate apparatus 60. As illustrated in FIG. 15, the boarding gate apparatus 60 includes a CPU 601, a RAM 602, a storage device 603, a communication I/F 604, an input device 606, a display device 607, an imaging device 609, and a gate 611. Each device is connected to a bus line 605.

Next, the operation of each apparatus in the information processing system 1 in the present example embodiment will be described with reference to FIG. 16 to FIG. 25.

[Check-in Procedure]

Figure 16:
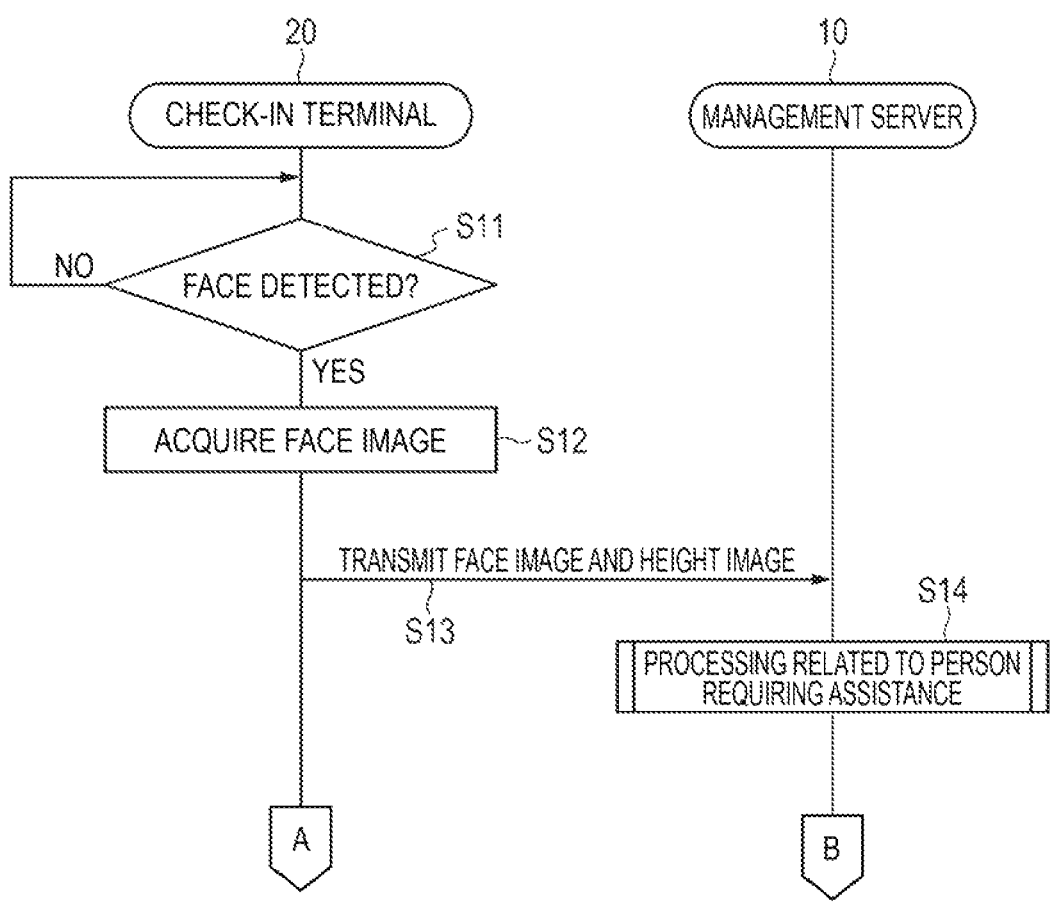
FIG. 16 is a sequence diagram (part 1) illustrating an example of processing of the check-in terminal and the management server in the first example embodiment.
Figure 20:
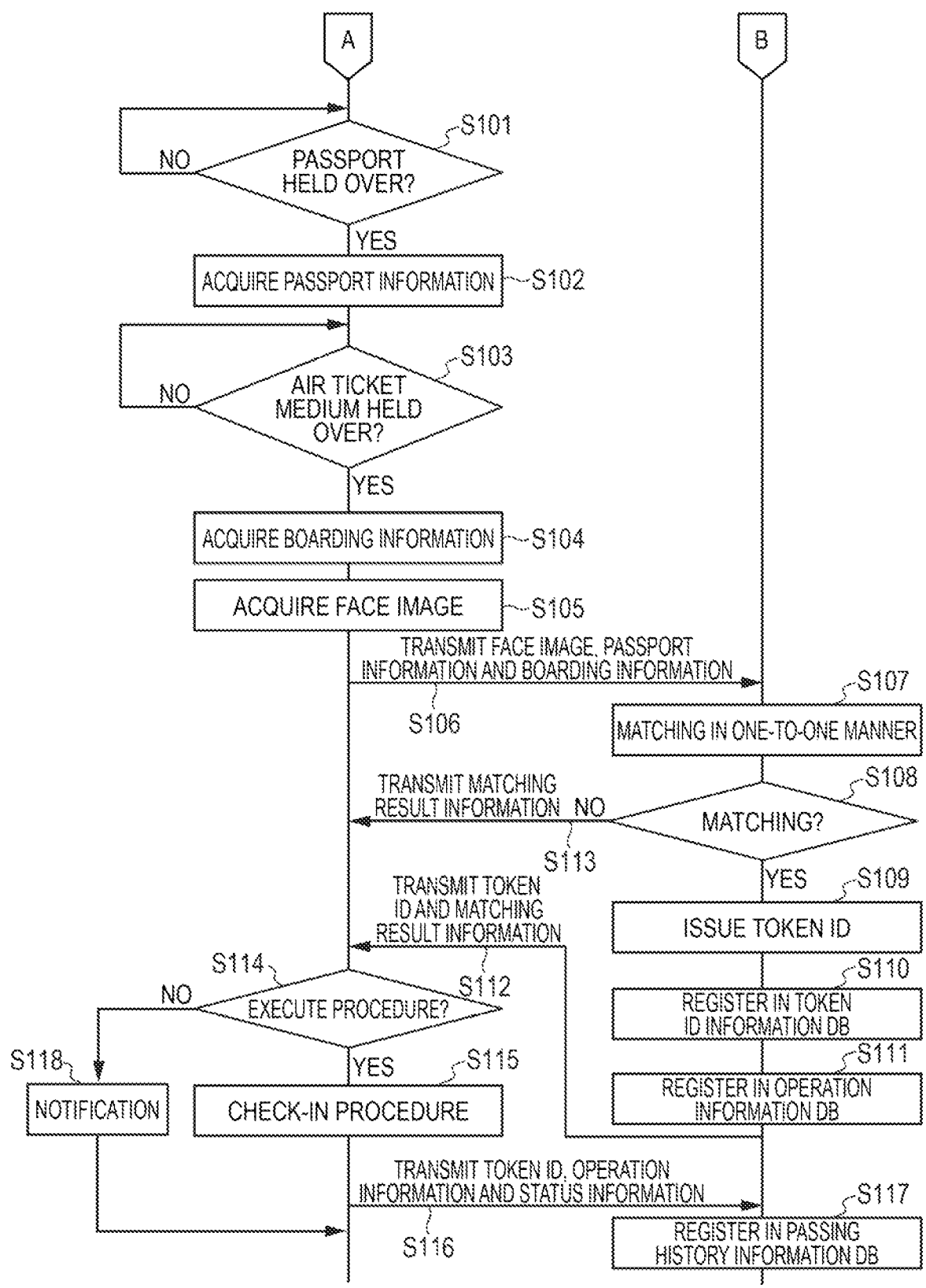
FIG. 20 is a sequence diagram (part 2) illustrating an example of the processing of the check-in terminal and the management server in the first example embodiment.

FIG. 16 and FIG. 20 are sequence diagrams illustrating an example of the processing of the check-in terminal 20 and the management server 10. This process is executed every time the user U performs the check-in procedure using the check-in terminal 20.

As illustrated in FIG. 16, the check-in terminal 20 always or periodically captures in front of the check-in terminal 20 by the first imaging device 209a and the second imaging device 209b, and determines whether or not the face of the user U located in front of the check-in terminal 20 is detected in the captured image (step S11). The check-in terminal 20 waits until the face of the user U is detected in the image by the first imaging device 209a or the second imaging device 209b (step S11, NO).

When the check-in terminal 20 determines that the face of the user U has been detected by the first imaging device 209a or the second imaging device 209b (step S11, YES), the check-in terminal captures the face of the user U by the first imaging device 209a or the second imaging device 209b that has detected the face. Thus, the check-in terminal 20 acquires the face image of the user U as the target face image (step S12).

Next, the check-in terminal 20 transmits the target face image captured by the first imaging device 209a or the second imaging device 209b together with the height information to the management server 10 via the network NW (step S13). Here, the height information is information relating to the height of the installation position of the imaging device which captured the target face image, specifically, information indicating that the first imaging device 209a installed at the low position or the second imaging device 209b installed at the high position captured the target face image. In the case of using the single imaging device 209c that can move up and down, the height information is, for example, information indicating the capturing height of the imaging device 209c when the face of the user U is captured. When transmitting the target face image, the check-in terminal 20 also transmits a terminal ID which is an identifier uniquely identifying the check-in terminal 20 to the management server 10. The management server 10 can identify the position of the check-in terminal 20 based on the terminal ID of the check-in terminal 20.

Figure 17:
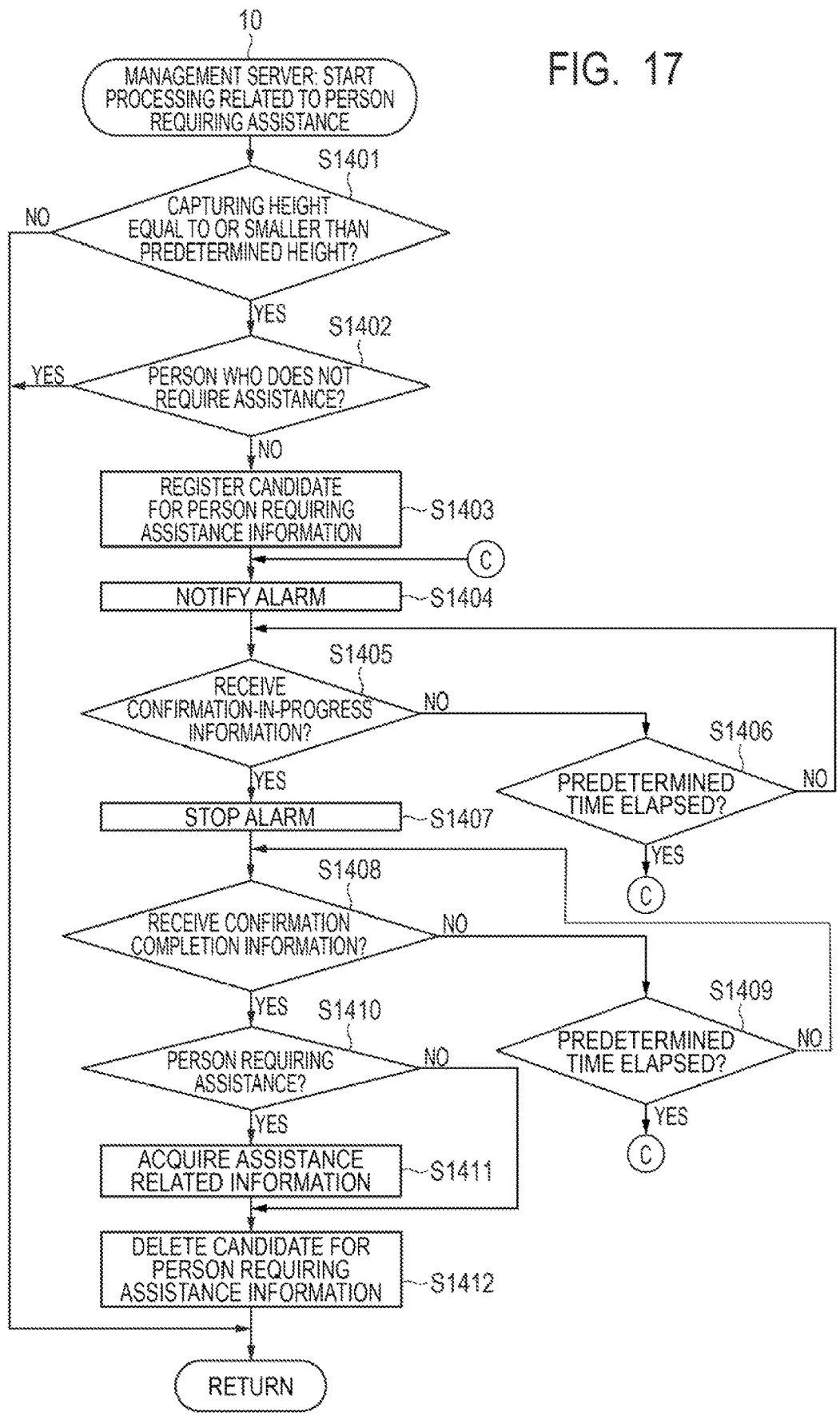
FIG. 17 is a flowchart illustrating an example of processing related to a person requiring assistance in the management server in the first example embodiment.
Figure 18:
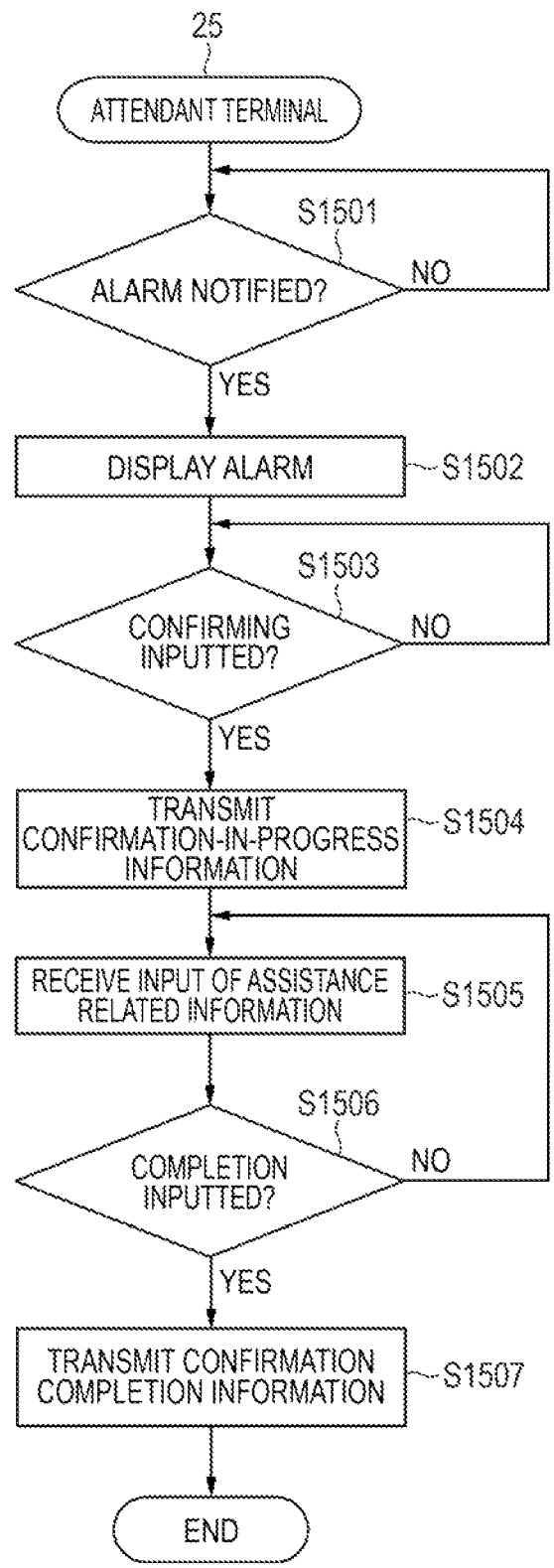
FIG. 18 is a flowchart illustrating an example of processing of the attendant terminal in the first example embodiment.

Upon receiving the target face image and the height information from the check-in terminal 20, the management server 10 executes processing related to person requiring assistance for detecting a candidate for person requiring assistance, and the like (step S14). FIG. 17 is a flowchart illustrating an example of the processing related to person requiring assistance in the management server 10. FIG. 18 is a flowchart illustrating an example of the processing of the attendant terminal 25 related to the processing related to person requiring assistance.

As illustrated in FIG. 17, the management server 10 determines, based on the height information received from the check-in terminal 20, whether or not the capturing height of the imaging device which captured the user U whose target face image was acquired is equal to or smaller than a predetermined height (step S1401). When the height information indicates that the first imaging device 209a has captured the target face image, the management server 10 determines that the capturing height is not higher than a predetermined height. On the other hand, when the height information indicates that the second imaging device 209b has captured the target face image, the management server 10 determines that the capturing height is not less than the predetermined height. In the case of using the single imaging device 209c movable up and down, the management server 10 can determine whether or not the capturing height of the imaging device 209c at the time of capturing the face of the user U is the predetermined height or less.

When the management server 10 determines that the capturing height is not equal to or smaller than the predetermined height (step S1401, NO), the management server 10 terminates the processing related to person requiring assistance.

On the other hand, when the management server 10 determines that the capturing height is equal to or smaller than the predetermined height (step S1401, YES), the management server 10 determines whether or not the user U who has captured the target face image is a person who does not require assistance as confirmed by the attendant S as described later (step S1402). The management server 10 matches the target face image received from the check-in terminal 20 and the plurality of registered face images registered in the token ID information DB 11 in a 1:N manner when determining whether the user U is a person who does not require assistance. The registered face image to be matching destination is limited to the image associated with the token ID in which the value of the invalid flag is "1" (valid). When the management server 10 finds a registered face image matched with the target face image as the result of the matching, the management server refers to the flag of person requiring assistance in the operation information of the operation information DB 13 by using the token ID associated with the registered face image as a key. When the referred flag of person requiring assistance is "0" (person who does not require assistance), the management server 10 determines that the user U is a person who does not require assistance. On the other hand, when the management server 10 does not find the registered face image matched with the target face image or when the flag of person requiring assistance is "1" (person requiring assistance), the management server 10 determines that the user U is not a person who does not require assistance.

When the management server 10 determines that the user U is a person who does not require assistance (step S1402, YES), the management server 10 terminates the processing related to person requiring assistance.

On the other hand, when the management server 10 determines that the user U is not a person who does not require assistance (step S1402, NO), the management server 10 registers, assuming that the user U is detected as a candidate for person requiring assistance, candidate for person requiring assistance information in the candidate for person requiring assistance information DB 15 (step S1403). The candidate for person requiring assistance information is information on the user detected as a candidate for person requiring assistance. The management server 10 registers, for each candidate ID, the target face image, the feature amount, the terminal ID of the check-in terminal 20, the detection time of the target face image, and the like as the candidate for person requiring assistance information in the candidate for person requiring assistance information DB 15 (see FIG. 6). Note that, in the present example embodiment, an alarm is again notified to the attendant S for the user U as the candidate for person requiring assistance, even whose flag of person requiring assistance is "1" and who has been confirmed as a person requiring assistance by the attendant S.

Next, the management server 10 notifies the attendant terminal 25 via the network NW of an alarm indicating that the candidate for person requiring assistance has been detected (step S1404). The alarm may include, for example, the position, the terminal ID, and the like of the check-in terminal 20 at which the candidate for person requiring assistance is detected. Based on the current position of each attendant terminal 25 registered in the attendant terminal information DB 14, the management server 10 can limit the attendant terminal 25 to which the alarm is notified to one or more attendant terminals 25 having a predetermined positional relationship with the position of the check-in terminal 20 at which the candidate requiring assistance is detected. For example, the management server 10 can limit the attendant terminal 25 for notifying the alarm to the attendant terminal 25 located within a predetermined distance from the position of the check-in terminal 20 at which the candidate for person requiring assistance is detected. For example, the management server 10 may limit the attendant terminal 25 for notifying the alarm to the attendant terminal 25 located at a position where the check-in terminal 20 at which the candidate for person requiring assistance is detected can be seen or at a position where the check-in terminal 20 at which the candidate for person requiring assistance is detected can be seen by moving slightly. Thus, the management server 10 can notify an alarm to the specific attendant terminal 25 among the plurality of attendant terminals 25.

On the other hand, as illustrated in FIG. 18, the attendant terminal 25 determines whether or not the alarm indicating that the candidate for person requiring assistance has been detected has been notified from the management server 10 (step S1501), and waits until the alarm is notified (step S1501, NO).

When the attendant terminal 25 determines that the alarm is notified from the management server 10 (step S1501, YES), the attendant terminal 25 displays a screen for notifying the alarm on the display device 257 (step S1502). It should be noted that the attendant terminal 25 can output an alarm by a message voice or sound effect from a voice output device (not shown) instead of or in combination with the display of a screen for notifying the alarm to the display device 257.

Figure 19:
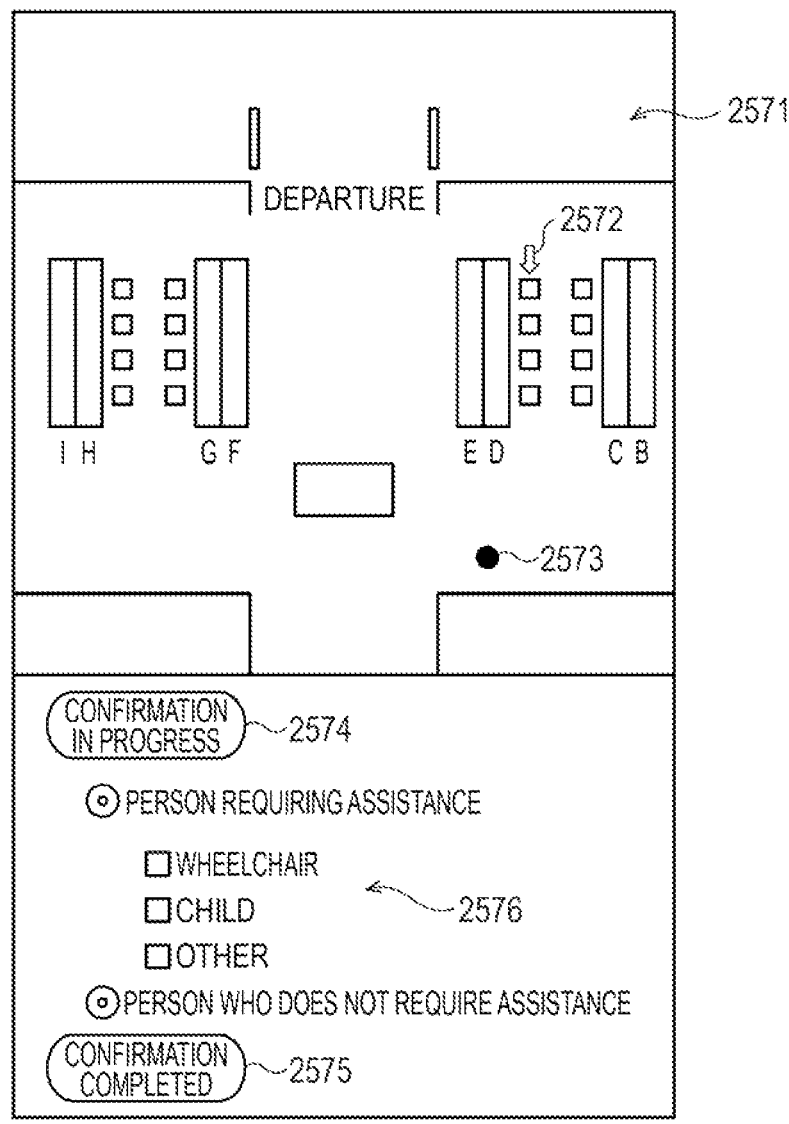
FIG. 19 is a diagram illustrating an example of a screen displayed on the attendant terminal in the first example embodiment.

FIG. 19 is a diagram illustrating an example of an alarm notification screen for notifying the alarm displayed on the display device 257 of the attendant terminal 25. As illustrated in FIG. 19, the attendant terminal 25 displays a premise map 2571 of the airport A on the alarm notification screen. Further, the attendant terminal 25 displays a detection position mark 2572 indicating the position of the check-in terminal 20 where the candidate for person requiring assistance is detected and a present position mark 2573 indicating the present position of the attendant terminal on the premise map 2571.

The attendant terminal 25 displays, on the alarm notification screen, a confirmation-in-progress button 2574 for inputting that the attendant S is confirming whether or not the candidate for person requiring assistance is a person requiring assistance, and a confirmation completion button 2575 for inputting that the attendant S has completed the confirmation. The attendant terminal 25 displays a group of buttons 2576 for inputting assistance related information on an alarm notification screen. The group of buttons 2576 includes selection buttons such as a radio button, a check button, or the like for inputting, as assistance related information, whether the candidate for person requiring assistance is a person requiring assistance or a person who does not require assistance, and the type of the wheelchair, the child, or the like, when the candidate for person requiring assistance is a person requiring assistance.

When the attendant S sees the alarm notification screen displayed on the attendant terminal 25, the attendant S can press the confirmation-in-progress button 2574 to input that the attendant S is confirming whether the candidate for person requiring assistance is a person requiring assistance. The attendant S under the confirmation can input assistance related information by checking the selection buttons of the group of buttons 2576. The attendant S who has completed the confirmation can press the confirmation completion button 2575 to input that the confirmation has been completed.

As illustrated in FIG. 18, the attendant terminal 25 displaying the alarm notification screen waits for the attendant S to input that the attendant S is checking whether the candidate for person requiring assistance is a person requiring assistance (step S1503, NO).

When the attendant terminal 25 determines that the fact that the attendant S is confirming is inputted (step S1503, YES), the attendant terminal 25 transmits the confirmationin-progress information indicating that the attendant S is confirming to the management server 10 via the network NW (step S1504).

Next, the attendant terminal 25 receives input of the assistance related information by the attendant S (step S1505).

The attendant terminal 25 waits for the attendant S to input that the attendant S has completed confirmation as to whether the candidate for person requiring assistance is a person requiring assistance (step S1506, NO).

When the attendant terminal 25 determines that the fact that the attendant S has completed the confirmation has been input (step S1506, YES), the attendant terminal 25 transmits confirmation completion information indicating that the attendant S has completed the confirmation to the management server 10 via the network NW (step S1507). The attendant terminal 25 transmits the assistance related information inputted by the attendant S together with the confirmation completion information to the management server 10 via the network NW. The assistance-related information indicates whether the candidate for person requiring assistance is a person requiring assistance or a person who does not require assistance, and the type of wheelchair, child, or the like in the case of the candidate being a person requiring assistance.

In this way, the confirmation-in-progress information and the confirmation completion information are transmitted to the management server 10 that has notified the alarm to the attendant terminal 25 in accordance with the confirmation status of the candidate for person requiring assistance by the attendant S.

As illustrated in FIG. 17, the management server 10 that has notified the attendant terminal 25 of the alarm determines whether or not the management server 10 has received the confirmation-in-progress information from the attendant terminal 25 (step S1405). When the management server 10 determines that the management server 10 has not received the confirmation-in-progress information (step S1405, NO), the management server 10 further determines whether or not a predetermined time has elapsed from the notification of the alarm (step S1406). When the management server 10 determines that the predetermined time has not elapsed (step S1406, NO), the management server 10 proceeds to step S1405 to continuously wait for the reception of the confirmation-in-progress information. When the management server 10 determines that the predetermined time has elapsed (step S1406, YES), the management server 10 proceeds to step S1404 to notify the attendant terminal 25 of the alarm again.

When notifying the alarm again, the management server 10 can expand the range of the attendant terminal 25 for notifying the alarm. For example, the management server 10 can notify the alarm to the attendant terminal 25 located within a distance range wider than the distance range of the attendant terminal 25 that was notified of the alarm last time.

On the other hand, when the management server 10 determines that the management server 10 has received the confirmation-in-progress information (step S1405, YES), the management server 10 instructs the attendant terminal 25 that has been notified of the alarm to stop the alarm via the network NW (step S1407). The attendant terminal 25 instructed to stop the alarm stops the display of the alarm on the display device 257 and stops the alarm.

The management server 10 that has instructed the stop of the alarm subsequently determines whether or not the management server 10 has received the confirmation completion information from the attendant terminal 25 (step S1408).

When the management server 10 determines that the management server 10 has not received the confirmation completion information (step S1408, NO), the management server 10 further determines whether or not a predetermined period of time has elapsed from the instruction to stop the alarm (step S1409). When the management server 10 determines that the predetermined time has not elapsed (step S1409, NO), the management server 10 proceeds to step S1408 to continuously wait for reception of the confirmation completion information. When the management server 10 determines that the predetermined time has elapsed (step S1409, YES), the management server 10 proceeds to step S1404 to notify the attendant terminal 25 of the alarm again.

The management server 10 can also expand the range of the attendant terminal 25 for notifying the alarm, as in the case of notifying the alarm again when the predetermined time has elapsed in step S1406.

On the other hand, when the management server 10 determines that he management server 10 has received the confirmation completion information (step S1408, YES), the management server 10 determines whether or not the candidate for person requiring assistance is a person requiring assistance based on the assistance related information transmitted together with the confirmation completion information (step S1410).

When the management server 10 determines that the candidate is not a person requiring assistance (step S1410, NO), the management server 10 deletes the candidate for person requiring assistance information registered in the candidate for person requiring assistance information DB 15 for the candidate for person requiring assistance (step S1412).

On the other hand, when the management server 10 determines that the candidate is a person requiring assistance (step S1410, YES), the management server 10 acquires and temporarily stores the assistance related information (step S1411). The management server 10 can temporarily store assistance related information in the RAM 102, the storage device 103, or the like. When registering the operation information to be described later in the operation information DB 13, the management server 10 can register the flag of person requiring assistance and the type of person requiring assistance in the operation information based on the temporarily stored assistance related information.

Next, the management server 10 deletes the candidate for person requiring assistance information registered in the candidate for person requiring assistance information DB 15 for the candidate for person requiring assistance (step S1412).

Thus, in the present example embodiment, the candidate for person requiring assistance is detected on the basis of the capturing height of the imaging device which has captured the target face image of the user U, and in response to the notification of the alarm indicating the detection of the candidate for person requiring assistance to the attendant terminal 25, the attendant S confirms whether or not the candidate for person requiring assistance is a person requiring assistance. In the present example embodiment, since the candidate for person requiring assistance is detected and found based on the capturing height of the imaging device without requiring complicated image processing, the candidate for person requiring assistance can be efficiently found with high accuracy.

Note that, although the case where the alarm is notified to the attendant terminal 25 used by the attendant S has been described above, the terminal to which the alarm is notified is not limited to this case. For example, the management server 10 can notify the alarm to a signage terminal which performs guide display, advertisement display, or the like, installed near or around the check-in terminal 20 where the candidate for person requiring assistance is detected, in the same manner as in the case of the attendant terminal 25. Thus, an attendant who does not have the terminal can notice the alarm. For example, the management server 10 can also notify a user terminal, which is a portable terminal carried and used by the user U detected as the candidate for person requiring assistance, of the alarm. In this case, the management server 10 can identify the user terminal carried by the candidate for person requiring assistance who is to be the notification destination of the alarm, based on the position information or the like transmitted from the application executed in the user terminal. Note that, when the alarm is sent to the signage terminal or the user terminal for the user U, information including guidance information (for example, information indicating the position of the wheelchair slope) can be sent as the alarm. Thus, the assistance of the user U can be promoted. The type and the amount of information to be notified to the user U can be appropriately changed according to the user U.

The user U who is confirmed to be a person requiring assistance can then perform the check-in procedure at the check-in terminal 20 while receiving assistance according to the required degree by the attendant S. In addition, with regard to the user U who is confirmed to be a person requiring assistance, the flag of person requiring assistance, which indicates that the user U is a person requiring assistance, is passed on as part of the operation information to the following procedures: the baggage drop procedure, the security inspection procedure, the departure examination procedure, and the boarding procedures. Therefore, in the subsequent procedures, the candidate for person requiring assistance can be easily identified among the users U based on the flag of person requiring assistance, and the assistance can be provided to the identified person requiring assistance by the attendant S.

As illustrated in FIG. 20, the check-in terminal 20 determines whether or not the passport of the user U is held over the reading unit (not shown) of the medium reading device 208 (step S101), and waits until the passport is held over the reading unit (step S101, NO).

Next, when the check-in terminal determines that the passport has been held over the reading unit of the medium reading device 208 (step S101, YES), the check-in terminal 20 acquires the passport information of the user U from the held passport (step S102). The acquired passport information includes the passport face image of the user U, the identification information, the passport number, the information of the country issuing the passport, and the like.

Next, the check-in terminal 20 determines whether or not the air ticket medium of the user U has been held over the reading unit of the medium reading device 208 (step S103), and waits until the air ticket medium is held over (step S103, NO).

Next, when the check-in terminal determines that the air ticket medium has been held over the reading unit of the medium reading device 208 (step S103, YES), the check-in terminal 20 acquires the boarding information of the user U from the held air ticket medium (step S104). At this time, the medium reading device 208 can acquire the boarding information (the last name, the first name, the airline code, the flight name, the boarding date, the departure place (boarding airport), the destination place (arrival airport), the seat number, the boarding time, the arrival time, and the like) of the user U from the airline ticket medium.

Next, the check-in terminal 20 captures the face of the user U by the imaging device 209, and acquires the face image as the target face image (step S105). It is preferable to display a screen for obtaining the consent of the user U before capturing the face image. Since the check-in terminal 20 has acquired the target face image of the user U by the first imaging device 209a or the second imaging device 209b in step S12, the capturing in step S105 can be omitted.

FIG. 21 illustrates an example of a screen displayed on the check-in terminal 20. Here, a description concerning the capturing of the face image ("If you register your face image, the following procedures until departure can be easily performed by face authentication.") and a button for selecting whether or not to capture the face image are displayed.

Next, the check-in terminal 20 transmits the captured target face image, the passport information, and the boarding information to the management server 10 (step S106).

Upon receiving the information from the check-in terminal 20, the management server 10 matches the passport face image of the user U and the target face image captured by the check-in terminal 20 in a one-to-one manner (step S107).

Next, when the management server 10 determines that the matching result indicates the passport face image and the target face image matches (step S108, YES), the management server 10 issues a token ID (step S109). The token ID is set to a unique value based on, for example, the date and time of processing or the sequence number.

Next, the management server 10 registers the relationship between the token ID and the registered face image in the token ID information DB 11 by using the target face image as the registered face image (step S110).

The reasons why a face image (target face image) captured at a site in the present example embodiment is used as the registered face image include that the valid period (life cycle) of the token ID is completed within the day, and that the image captured in the subsequent authentication process and the quality (appearance) of the captured image are closer than those of the passport face image. However, the passport face image may be set as the registered face image (registered biometric information) instead of the target face image (captured face image). For example, if the life cycle of the token ID is long (For example, in the aviation industry, the token ID is validated for a member for a certain period of time), the face image of the passport or a license may be set as the registered face image.

Next, the management server 10 registers the relationship between the token ID and the operation information in the operation information DB 13 using the passport information and the boarding information as operation information (step S111). That is, the control data necessary for the face authentication and the operation information necessary for the execution of the operation are managed in the separate databases, but the registered face image and the operation information are related by the token ID. The control data in the present example embodiment means data including the registered face image to be matched with the target face image in face authentication and various data items such as an invalid flag associated with the token ID together with the registered face image (see FIG. 2).

When the assistance related information temporarily stored in step S1411 exists, the management server 10 sets the flag of person requiring assistance from "0" (person who does not require assistance) to "1" (person requiring assistance) as the operation information registered in the operation information DB 13 based on the assistance related information. The management server 10 registers the type of person requiring assistance such as a wheelchair or a child as the operation information based on the assistance related information.

Next, the management server 10 transmits the issued token ID and the matching result information indicating the matching to the check-in terminal 20 (step S112).

On the other hand, when the management server 10 determines that matching result of the passport face image and the target face image is mismatching (step S108, NO), the management server 10 transmits matching result information indicating the mismatching to the check-in terminal 20 (step S113).

Next, when the check-in terminal 20 determines that the check-in procedure can be executed on the basis of the matching result indicating the matching received from the management server 10 (step S114, YES), the check-in terminal 20 executes the check-in procedure such as the confirmation of the itinerary, the selection of the seat, or the like on the basis of the input information of the user U (step S115). Then, the check-in terminal 20 transmits the token ID, the operation information, and status information indicating the completion of the procedure in the check-in terminal 20 to the management server 10 (step S116). Note that the status information includes information such as the passing time of the touch point and the device name of the terminal used.

Next, upon receiving the information from the check-in terminal 20, the management server 10 registers the passing history information indicating the relationship between the token ID and the passing information of the touch point P1 in the passing history information DB 12 (step S117). The management server 10 updates the operation information DB 13 based on the operation information received from the check-in terminal 20 as required.

On the other hand, when the check-in terminal 20 determines that the check-in procedure cannot be executed based on the matching result indicating the mismatching received from the management server 10 (step S114, NO), the check-in terminal 20 notifies the user U of an error message (step S118).

In this manner, the target face image (captured face image) matching with the passport face image acquired from the passport in the check-in procedure are registered as the registered face image in the token ID information DB 11, and the registered face image and the operation information in the operation information DB 13 are associated with each other according to the issued token ID. Thus, matching processing of a captured face image and the registered face image is enabled at each subsequent touch point. That is, the token ID associated with the registered face image is identification information that is commonly available at all the touch points. By using such a common token ID, the examination of the user U can be made more efficient.

Further, when it is confirmed that the user U is a person requiring assistance, the flag of person requiring assistance indicating that the user U is a person requiring assistance is set as a part of the operation information, so that the candidate for person requiring assistance can be easily specified based on the flag of person requiring assistance in the subsequent procedure.

[Baggage Drop Procedure]

Figure 22:
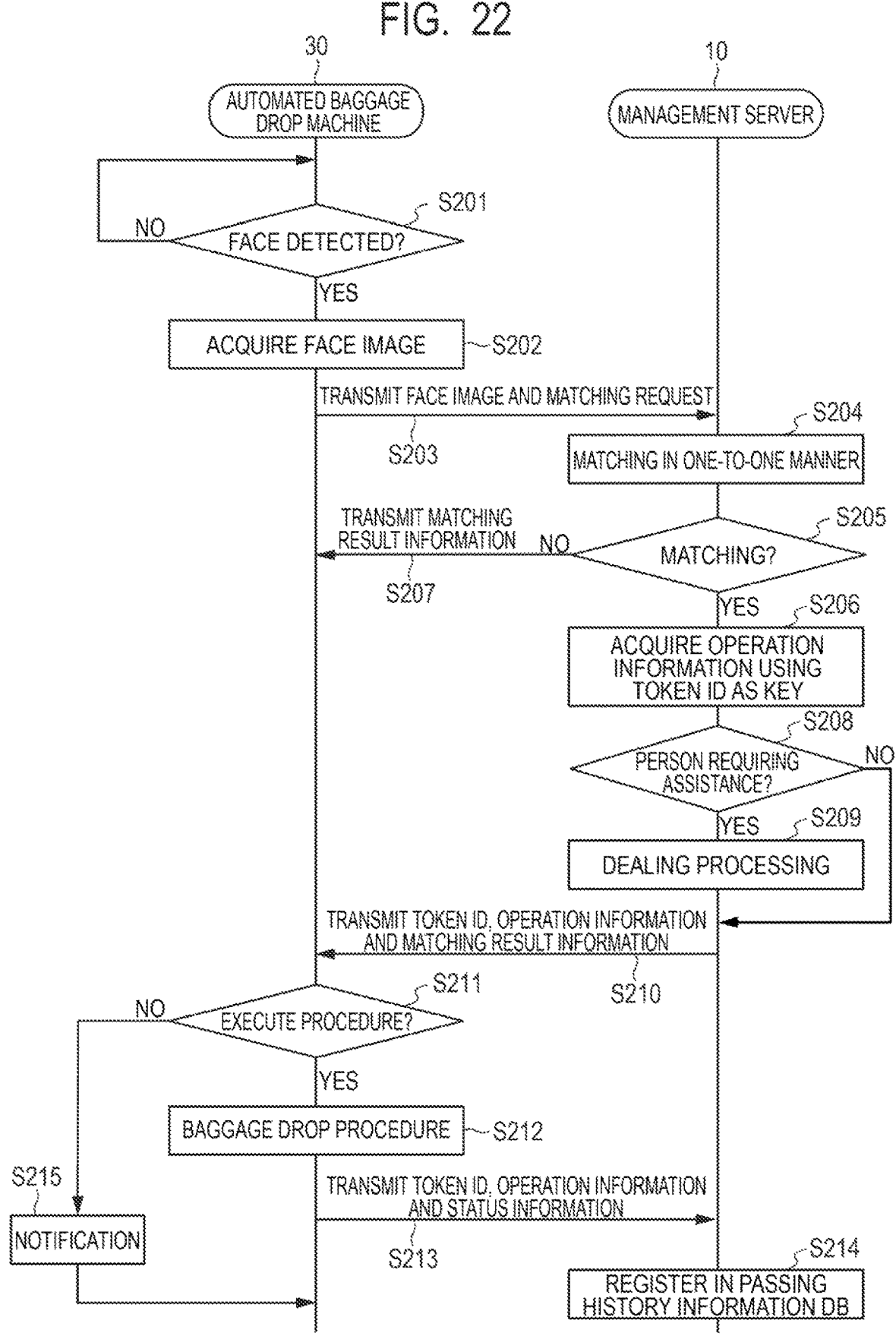
FIG. 22 is a sequence diagram illustrating an example of processing of the automated baggage drop machine and the management server in the first example embodiment.

FIG. 22 is a sequence diagram illustrating an example of the processing of the automated baggage drop machine 30 and the management server 10. This processing is executed when the user U who has completed the check-in procedure takes the baggage drop procedure as necessary.

The automated baggage drop machine 30 always or periodically captures the front of the machine, and determines whether or not the face of the user U standing in front of the automated baggage drop machine 30 is detected in the captured image (step S201). The automated baggage drop machine 30 waits until the imaging device 309 detects the face of the user U in the image (step S201, NO).

When the automated baggage drop machine 30 determines that the face of the user U is detected by the imaging device 309 (step S201, YES), the automated baggage drop machine captures the face of the user U and acquires the face image of the user U as a target face image (step S202).

Next, the automated baggage drop machine 30 transmits the target face image of the user U captured by the imaging device 309 to the management server 10 together with matching request via the network NW (step S203). Thus, the automated baggage drop machine 30 requests the management server 10 to match the target face image of the user U captured by the imaging device 309 and the plurality of registered face images registered in the token ID information DB 11 of the management server 10 in a 1:N manner.

Upon receiving the target face image and the matching request from the automated baggage drop machine 30, the management server 10 performs matching of the face image of the user U (step S204). That is, the management server 10 matches the target face image received from the automated baggage drop machine 30 and the plurality of registered face images registered in the token ID information DB 11 in a 1:N manner. The registered face image to be matching destination is limited to the image associated with the token ID in which the value of the invalid flag is "1" (valid).

If the management server 10 determines that the matching result is mismatching (step S205, NO), the management server 10 transmits the matching result information indicating the mismatching to the automated baggage drop machine 30 (step S207), and the processing proceeds to step S211. On the other hand, when the management server 10 determines that the matching result is matching (step S205, YES), the processing proceeds to step S206.

In step S206, the management server 10 acquires operation information from the operation information DB 11 using the token ID associated with the registered face image of the matching in the token ID information DB 13 as a key.

Next, the management server 10 determines whether or not the user U is a person requiring assistance based on the flag of person requiring assistance included in the acquired operation information (step S208). The management server 10 determines that the user U is a person requiring assistance when the flag of person requiring assistance is "1", and determines that the user is a person who does not require assistance when the flag of person requiring assistance is "0". Thus, the management server 10 can easily identify the person requiring assistance from among the users U performing the baggage drop procedure based on the flag of person requiring assistance.

When the management server 10 determines that the user U is not a person requiring assistance (step S208, NO), the management server 10 proceeds to the next step as it is. On the other hand, when the management server 10 determines that the user U is a person requiring assistance (step S208, YES), the management server 10 executes processing for dealing with the person requiring assistance (step S209), and proceeds to the next step. The management server 10 can notify, for example, an alarm indicating that the user U is a person requiring assistance to the attendant terminal 25 carried by the attendant S engaged in the baggage drop procedure, the attendant S engaged in the operation dealing with person requiring assistance, and the like. At this time, the management server 10 can notify the type of person requiring assistance included in the operation information together with the alarm.

Next, the management server 10 transmits the matching result information, the token ID, and the operation information to the automated baggage drop machine 30 (step S210). Note that the management server 10 can execute the step S210 and the steps S208 and S209 described above regardless of the sequence, and can also execute them in parallel.

Next, when the automated baggage drop machine 30 determines that the procedure can be executed based on the matching result information and the operation information (step S211, YES), the automated baggage drop machine 30 executes the processing of the baggage drop procedure of the user U based on the operation information (step S212).

Next, the automated baggage drop machine 30 transmits the token ID, the operation information, and status information indicating that the baggage drop procedure of the user U is completed via matching of the face image to the management server 10 via the network NW (step S213). The status information includes information such as the passing time of the touch point and the device name of the terminal used.

Upon receiving the information from the automated baggage drop machine 30, the management server 10 registers the passing history information indicating the relationship between the token ID and the passage information of the touch point P2 of the user U in the passing history information DB 12 (step S214). The management server 10 updates the operation information DB 13 based on the operation information received from the automated baggage drop machine 30 as required.

On the other hand, when the automated baggage drop machine 30 determines that the procedure cannot be executed based on the matching result information and the operation information (step S211, NO), the automated baggage drop machine 30 notifies the user U of an error message (step S215).

[Safety Inspection Procedure]

Figure 23:
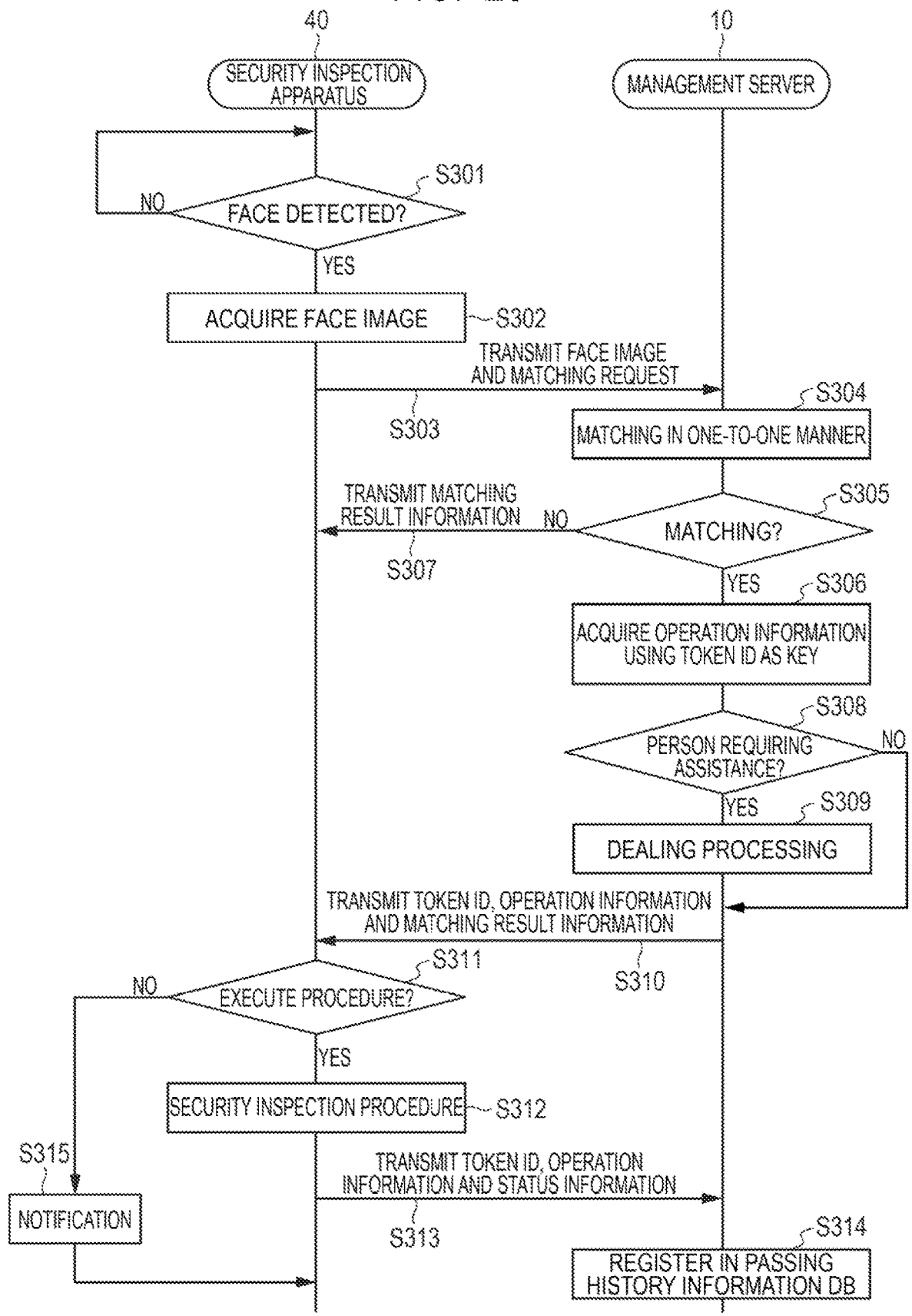
FIG. 23 is a sequence diagram illustrating an example of processing of the security inspection apparatus and the management server in the first example embodiment.

FIG. 23 is a sequence diagram illustrating an example of the processing of the security inspection apparatus 40 and the management server 10. This processing is executed when the user U who has completed the check-in procedure takes the security inspection procedure.

The security inspection apparatus 40 always or periodically captures the front of the metal detection gate 410, and determines whether or not the face of the user U standing in front of the metal detection gate 410 is detected in the captured image (step S301). The security inspection apparatus 40 waits until the imaging device 409 detects the face of the user U in the image (step S301, NO).

When the security inspection apparatus 40 determines that the face of the user U is detected by the imaging device 409 (step S301, YES), the security inspection apparatus 40 captures the face of the user U and acquires the face image of the user U as the target face image (step S302).

Next, the security inspection apparatus 40 transmits the target face image of the user U captured by the imaging device 409 to the management server 10 together with matching request via the network NW (step S303). Thus, the security inspection apparatus 40 requests the management server 10 to match the target face image of the user U captured by the imaging device 409 and the plurality of registered face images registered in the token ID information DB 11 of the management server 10 in a 1:N manner.

Upon receiving the target face image and the matching request from the security inspection apparatus 40, the management server 10 performs matching of the face image of the user U (step S304). That is, the management server 10 matches the target face image received from the security inspection apparatus 40 and the plurality of registered face images registered in the token ID information DB 11 in a 1:N manner. The registered face image to be matching destination is limited to the image associated with the token ID in which the value of the invalid flag is "1" (valid).

When the management server 10 determines that the matching result is mismatching (step S305, NO), the management server 10 transmits matching result information indicating the mismatching to the security inspection apparatus 40 (step S307), and the processing proceeds to step S311. On the other hand, when the management server 10 determines that the matching result is matching (step S305, YES), the process proceeds to step S306.

In step S306, the management server 10 acquires the operation information from the operation information DB 11 using the token ID associated with the registered face image of the matching in the token ID information DB 13 as a key.

Next, the management server 10 determines whether or not the user U is a person requiring assistance in the same manner as in step S208 of FIG. 22 based on the flag of person requiring assistance included in the acquired operation information (step S308). Thus, the management server 10 can easily identify the person requiring assistance from among the users U performing the security inspection procedure based on the flag of person requiring assistance.

When the management server 10 determines that the user U is not a person requiring assistance (step S308, NO), the management server 10 proceeds to the next step as it is. On the other hand, when the management server 10 determines that the user U is a person requiring assistance (step S308, YES), the management server 10 executes processing for dealing with the person requiring assistance (step S309), and proceeds to the next step. The management server 10 can notify, for example, an alarm indicating that the user U is a person requiring assistance to the attendant terminal 25 carried by the attendant S engaged in the security inspection procedure, the attendant S engaged in the operation dealing with person requiring assistance, and the like. At this time, the management server 10 can notify the type of person requiring assistance included in the operation information together with the alarm.

Next, the management server 10 transmits the matching result information, the token ID, and the operation information to the security inspection apparatus 40 (step S310). Note that the management server 10 can execute the step S310 and the steps S308 and S309 described above regardless of the sequence, and can also execute them in parallel.

Next, when the security inspection apparatus 40 determines that the procedure can be executed based on the matching result information and the operation information (step S311, YES), the security inspection apparatus 40 executes the safety inspection procedure of the user U based on the operation information (step S312). In the safety inspection procedure, the CPU 401 controls each part of the security inspection apparatus 40. Thus, the security inspection apparatus 40 detects the metals worn by the user U passing through the metal detection gate 410. After passing through the metal detection gate 410, the user U goes to the departure examination area.

Next, the security inspection apparatus 40 transmits the token ID, the operation information, and status information indicating that the security inspection procedure of the user U has been completed via the matching of the face image to the management server 10 via the network NW (step S313). The status information includes information such as the passing time of the touch point and the device name of the terminal used.

Upon receiving the information from the security inspection apparatus 40, the management server 10 registers the passing history information indicating the relationship between the token ID and the passing information of the touch point P3 of the user U in the passing history information DB 12 (step S314). The management server 10 updates the operation information DB 13 based on the operation information received from the security inspection apparatus 40 as required.

On the other hand, when the security inspection apparatus 40 determines that the procedure cannot be executed based on the matching result information and the operation information (step S311, NO), the security inspection apparatus 40 notifies the user U of an error message (step S315).

[Departure Examination Procedure]

Figure 24:
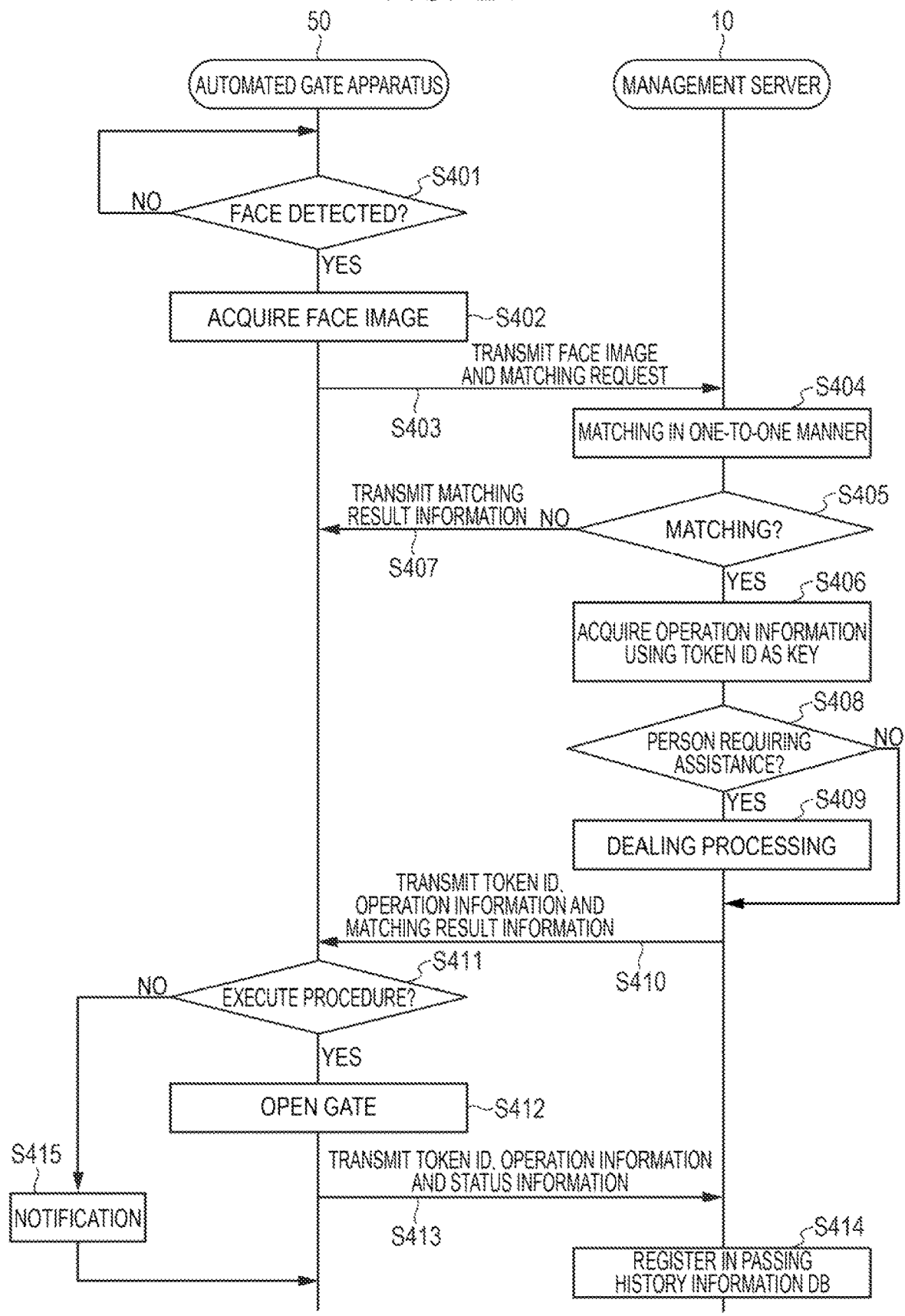
FIG. 24 is a sequence diagram illustrating an example of processing of the automated gate apparatus and the management server in the first example embodiment.

FIG. 24 is a sequence diagram illustrating an example of the processing of the automated gate apparatus 50 and the management server 10.

After completing the security inspection procedure, the user U goes to the departure examination area and undergoes the departure examination procedure with the automated gate apparatus 50. The automated gate apparatus 50 and the management server 10 execute the processing illustrated in FIG. 24 at each time when each of the plurality of users U undergoes the departure examination procedure.

The automated gate apparatus 50 always or periodically captures the front of the automated gate apparatus 50, and determines whether or not the face of the user U standing in front of the automated gate apparatus 50 is detected in the captured image (step S401). The automated gate apparatus 50 waits until the imaging device 509 detects the face of the user U in the image (step S401, NO).

When the automated gate apparatus 50 determines that the face of the user U is detected by the imaging device 509 (step S401, YES), the automated gate apparatus 50 captures the face of the user U and acquires the face image of the user U as a target face image (step S402).

Next, the automated gate apparatus 50 transmits the target face image of the user U captured by the imaging device 509 to the management server 10 together with matching request via the network NW (step S403). Thus, the automated gate apparatus 50 requests the management server 10 to match the target face image of the user U captured by the imaging device 509 and the plurality of registered face images registered in the token ID information DB 11 of the management server 10 in a 1:N manner.

Upon receiving the target face image and the matching request from the automated gate apparatus 50, the management server 10 performs matching of the face image of the user U (step S404). That is, the management server 10 matches the target face image received from the automated gate apparatus 50 and the plurality of registered face images registered in the token ID information DB 11 in a 1:N manner. The registered face image to be matching destination is limited to the image associated with the token ID in which the value of the invalid flag is "1" (valid).

If the management server 10 determines that the matching result is mismatching (step S405, NO), the management server 10 transmits matching result information indicating the mismatching to the automated gate apparatus 50 (step S407), and the processing proceeds to step S411. On the other hand, when the management server 10 determines that the matching result is matching (step S405, YES), the processing proceeds to step S406.

In step S406, the management server 10 acquires the operation information from the operation information DB 11 using the token ID associated with the registered face image of the matching in the token ID information DB 13 as a key.

Next, the management server 10 determines whether or not the user U is a person requiring assistance in the same manner as in step S208 of FIG. 22 based on the flag of person requiring assistance included in the acquired operation information (step S408). In this way, the management server 10 can easily identify the person requiring assistance from among the users U performing the departure examination procedure based on the flag of person requiring assistance.

When the management server 10 determines that the user U is not a person requiring assistance (step S408, NO), the management server 10 proceeds to the next step as it is. On the other hand, when the management server 10 determines that the user U is a person requiring assistance (step S408, YES), the management server 10 executes processing for dealing with the person requiring assistance (step S409), and proceeds to the next step. The management server 10 can notify, for example, an alarm indicating that the user U is a person requiring assistance to the attendant terminal 25 carried by the attendant S engaged in the departure examination procedure, the attendant S engaged in the operation dealing with person requiring assistance, and the like. At this time, the management server 10 can notify the type of person requiring assistance included in the operation information together with the alarm.

Next, the management server 10 transmits the matching result information, the token ID, and the operation information to the automated gate apparatus 50 (step S410). Note that the management server 10 can execute the step S410 and the steps S408 and S409 described above regardless of the sequence, and can also execute them in parallel.

Next, when the automated gate apparatus 50 determines that the procedure can be executed based on the matching result information and the operation information (step S411, YES), the automated gate apparatus 50 executes the departure examination procedure of the user U based on the operation information and opens the gate 511 (step S412). After passing the touch point P4, the user U goes to the departure area where the boarding gate is located.

Next, the automated gate apparatus 50 transmits the token ID, the operation information, and the status information indicating that the departure examination procedure of the user U has been completed via matching of the face image to the management server 10 via the network NW (step S413). The status information includes information such as the passing time of the touch point and the device name of the terminal used.

Upon receiving the information from the automated gate apparatus 50, the management server 10 registers passing history information indicating the relationship between the token ID and the passing information of the touch point P4 of the user U in the passing history information DB 12 (step S414). The management server 10 updates the operation information DB 13 based on the operation information received from the automated gate apparatus 50 as required.

On the other hand, when the automated gate apparatus 50 determines that the procedure cannot be executed based on the matching result information and the operation information (step S411, NO), the automated gate apparatus 50 notifies the user U of an error message (step S415). For example, a notification screen including a message such as "Please go through the departure examination procedure at the manned counter." is displayed on the display device 507.

[Flight Procedure]

Figure 25:
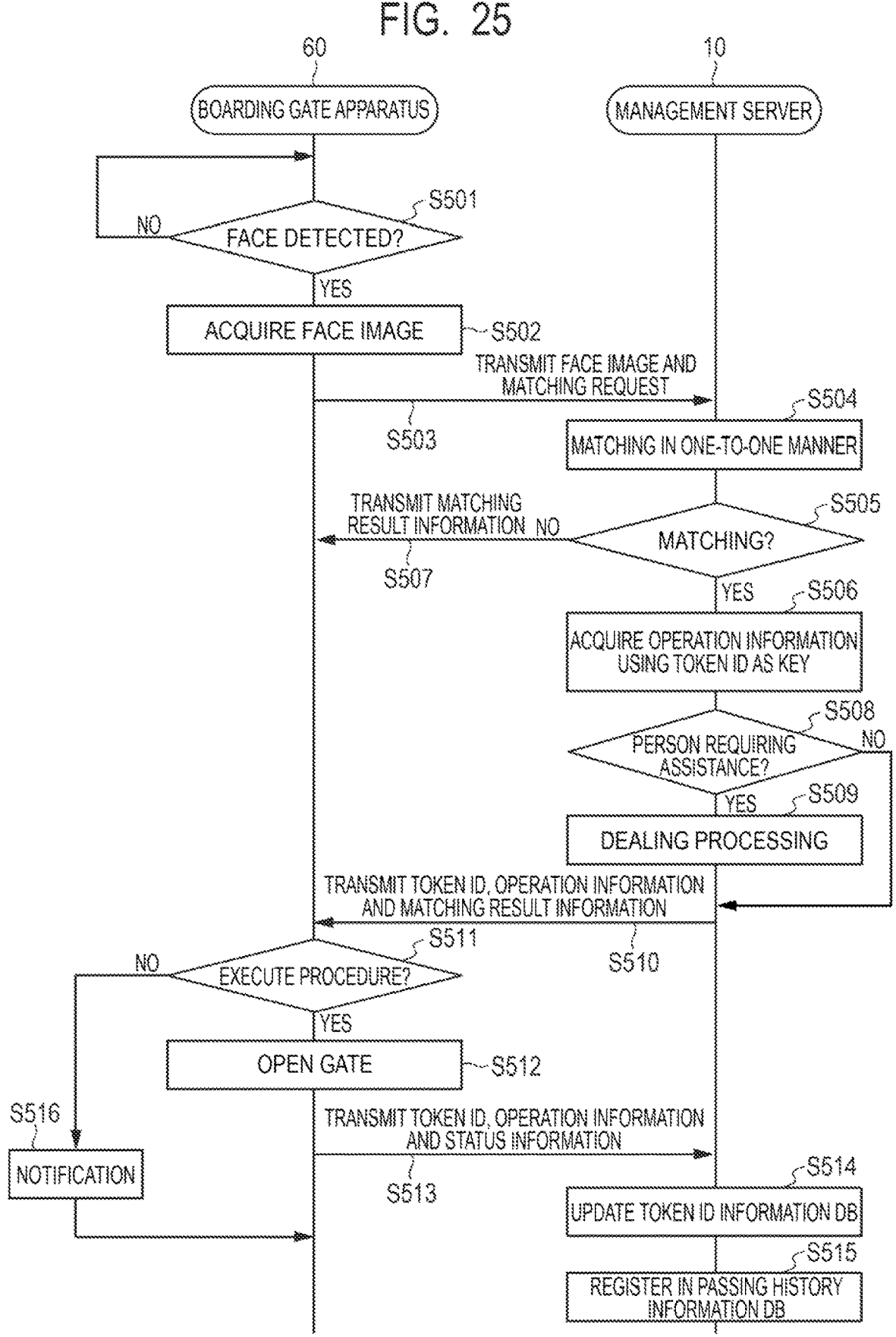
FIG. 25 is a sequence diagram illustrating an example of processing of the boarding gate apparatus and the management server in the first example embodiment.

FIG. 25 is a sequence diagram illustrating an example of the processing of the boarding gate apparatus 60 and the management server 10.

The boarding gate apparatus 60 always or periodically captures the front of the device and determines whether or not the face of the user U standing in front of the boarding gate apparatus 60 is detected in the captured image (step S501). The boarding gate apparatus 60 waits until the imaging device 609 detects the face of the user U in the image (step S501, NO).

When the boarding gate apparatus 60 determines that the face of the user U is detected by the imaging device 609 (step S501, YES), the boarding gate apparatus 60 captures the face of the user U and acquires the face image of the user U as a target face image (step S502).

Next, the boarding gate apparatus 60 transmits the target face image of the user U captured by the imaging device 609 to the management server 10 together with matching request via the network NW (step S503). Thus, the boarding gate apparatus 60 requests the management server 10 to match the target face image of the user U captured by the imaging device 609 and the plurality of registered face images registered in the token ID information DB 11 of the management server 10 in a 1:N manner.

Upon receiving the target face image and the matching request from the boarding gate apparatus 60, the management server 10 performs matching of the face image of the user U (step S504). That is, the management server 10 matches the target face image received from the boarding gate apparatus 60 and the plurality of registered face images registered in the token ID information DB 11 in a 1:N manner. The registered face image to be matching destination is limited to the image associated with the token ID in which the value of the invalid flag is "1" (valid).

If the management server 10 determines that the matching result is mismatching (step S505, NO), the management server 10 transmits matching result information indicating the mismatching to the boarding gate apparatus 60 (step S507), and the processing proceeds to step S511. On the other hand, when the management server 10 determines that the matching result is matching (step S505, YES), the processing proceeds to step S506.

In step S506, the management server 10 acquires the operation information from the operation information DB 11 using the token ID associated with the registered face image of the matching in the token ID information DB 13 as a key.

Next, the management server 10 determines whether or not the user U is a person requiring assistance in the same manner as in step S208 of FIG. 22 based on the flag of person requiring assistance included in the acquired operation information (step S508). Thus, the management server 10 can easily identify the person requiring assistance from among the user U taking the boarding procedure based on the flag of person requiring assistance.

When the management server 10 determines that the user U is not a person requiring assistance (step S508, NO), the management server 10 proceeds to the next step as it is. On the other hand, when the management server 10 determines that the user U is a person requiring assistance (step S508, YES), the management server 10 executes processing for dealing with the person requiring assistance (step S509), and proceeds to the next step. The management server 10 can notify, for example, an alarm indicating that the user U is a person requiring assistance to the attendant terminal 25 carried by the attendant S engaged in the boarding procedure, the attendant S engaged in the operation dealing with person requiring assistance, and the like. At this time, the management server 10 can notify the type of person requiring assistance included in the operation information together with the alarm.

Next, the management server 10 transmits the matching result information, the token ID, and the operation information to the boarding gate apparatus 60 (step S510). Note that the management server 10 can execute the step S510 and the steps S508 and S509 described above regardless of the sequence, and can also execute them in parallel.

Next, when the boarding gate apparatus 60 determines that the procedure can be executed based on the matching result information and the operation information (step S511, YES), the boarding gate apparatus 60 executes the boarding procedure of the user U to the aircraft based on the operation information and opens the gate 611 (step S512). The user U who has passed the touch point P5 boards the aircraft.

Next, the boarding gate apparatus 60 transmits the token ID, the operation information, and status information indicating that the boarding procedure of the user U to the aircraft has been completed via the matching of the face image to the management server 10 via the network NW (step S513). The status information includes information such as the passing time of the touch point and the device name of the terminal used.

Upon receiving the information from the boarding gate apparatus 60, the management server 10 updates the token ID information DB 11 (step S514). Specifically, the management server 10 updates the invalid flag of the token ID information DB 11 to an invalid value ("0"). This causes the valid period (life cycle) of the token ID to expire.

Then, the management server 10 registers passing history information indicating the relationship between the token ID and the passing information of the touch point P5 of the user U in the passing history information DB 12 (step S515).

On the other hand, when the boarding gate apparatus 60 determines that the procedure cannot be executed based on the matching result information and the operation information (step S511, NO), the boarding gate apparatus 60 notifies the user U of an error message (step S516). For example, the boarding gate apparatus 60 displays a notification screen including a message such as "Please use the manned counter." on the display device 607.

As described above, according to the present example embodiment, the management server 10 associates the control data for face authentication and the operation information used for various operations with the token ID. Further, the management server 10 controls the expiration of the valid period of the token ID in accordance with the end of a series of operations. That is, since the validity or invalidity of the association by the token ID can be easily switched, the heterogeneous databases can be associated at an advanced security level.

In the case of an airport facility, a series of procedure operations at the touch points P1 to P5 are executed in a predetermined order. The management server 10 can expire the valid period of the token ID in accordance with the end of a series of operations. Specifically, the token ID is invalidated based on the completion of the last operation in the sequence (the boarding procedure at the boarding gate), that is, the passage of the user U through the boarding gate. Thus, the management server 10 can limit the association state of the data by the token ID to a necessary period.

Further, according to the present example embodiment, since the candidate for person requiring assistance is detected and found based on the capturing height of the imaging device without requiring complicated image processing, the candidate for person requiring assistance can be efficiently found with high accuracy. In addition, according to the present example embodiment, since the flag of person requiring assistance set in the check-in procedure is passed on to the subsequent procedure, the candidate for person requiring assistance can be easily identified from among the users U in the subsequent procedure.

Second Example Embodiment

An information processing system 2 in the present example embodiment will be described below. Note that the same reference numerals as those assigned in the figure of first example embodiment indicate the same objects. The description of the parts common to the first example embodiment will be omitted, and the different parts will be described in detail.

Figure 26:
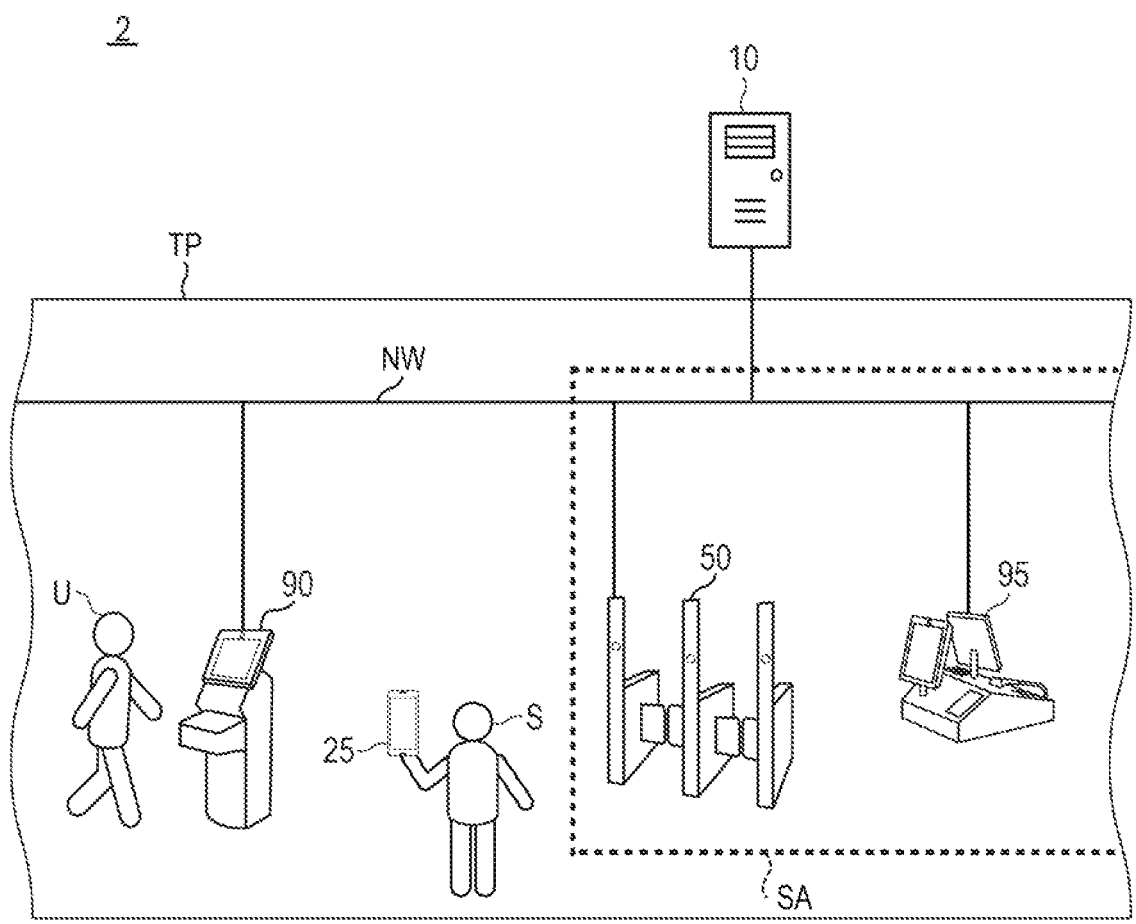
FIG. 26 is a block diagram illustrating an example of the overall configuration of an information processing system in a second example embodiment.

FIG. 26 is a block diagram illustrating an example of the overall configuration of the information processing system 2 in the present example embodiment. The information processing system 2 is a computer system for supporting various operations related to the operation of a theme park TP. In FIG. 26, in the information processing system 2, an automatic ticket vending machine 90 for selling entrance tickets, an attendant terminal 25, an automated gate apparatus 50 installed at an entrance of a security area SA of the theme park TP, and a POS terminal 95 installed in the security area SA are connected to a management server 10 via a network NW. The attendant terminal 25 is carried and used by an attendant S such as an employee of the theme park TP or is installed in a predetermined place and used by the attendant S. The automatic ticket vending machine 90 of the present example embodiment is provided at the entrance of the theme park TP, but the installation place is not limited to this place. For example, the automatic ticket vending machine 90 may be installed in a store such as a convenience store away from the theme park TP.

Similarly to the first example embodiment, the management server 10 in the present example embodiment includes a token ID information DB 11, a passing history information DB 12, an operation information DB 13, an attendant terminal information DB 14, and a candidate for person requiring assistance information DB 15. However, since the operations in the present example embodiment is different from the operations in the first example embodiment, the data items of the operation information stored in the operation information DB 13 are also different. Specifically, the operations in the present example embodiment include operations involving commercial transactions within the theme park TP. Therefore, the operation information includes payment information such as a credit card number. The management server 10 and the automated gate apparatus 50 can control entry and exit of the user U based on face authentication even for the user U whose payment information is not registered.

Figure 27:
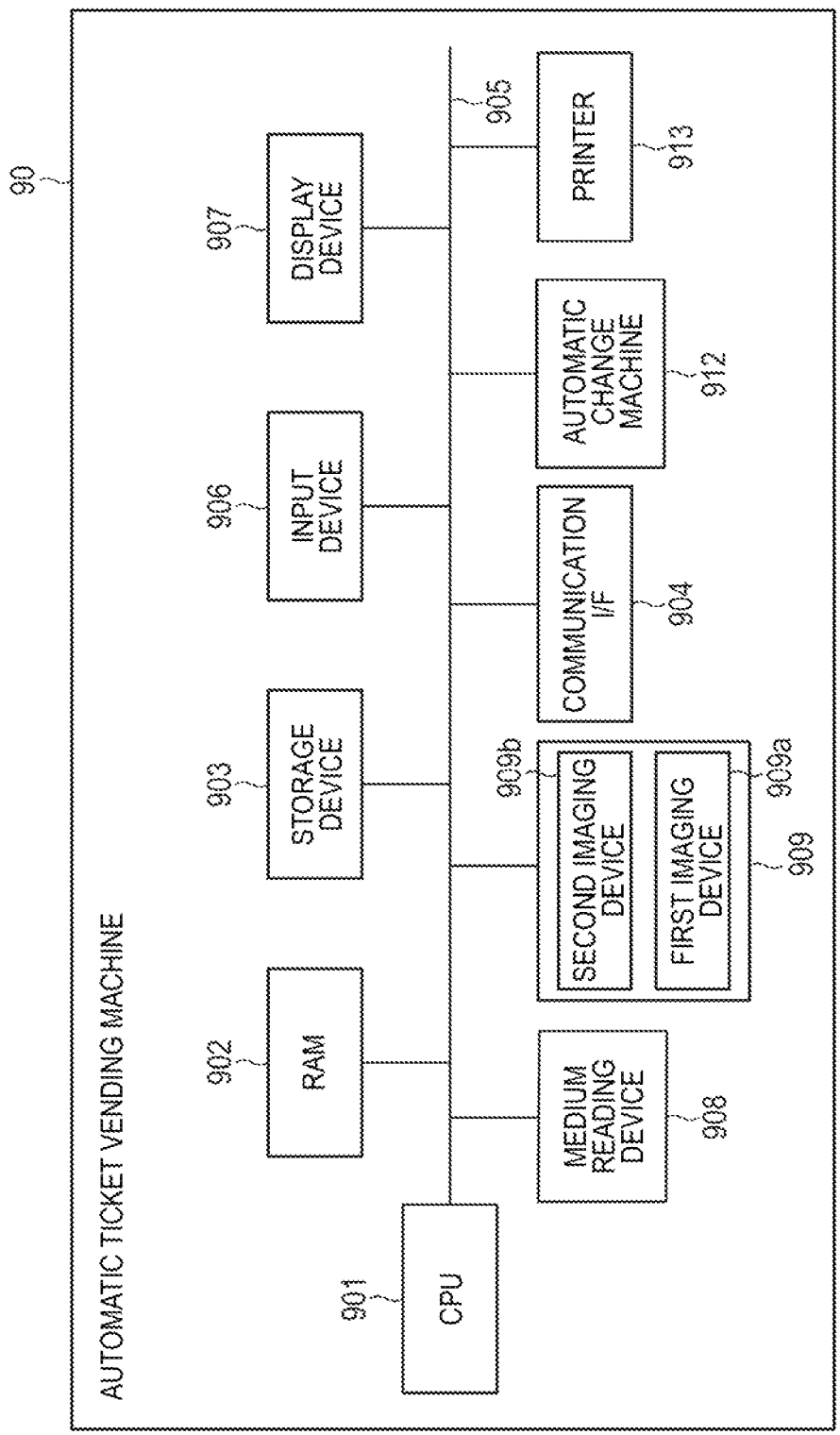
FIG. 27 is a block diagram illustrating an example of a hardware configuration of an automatic ticket vending machine in the second example embodiment.

FIG. 27 is a block diagram illustrating an example of the hardware configuration of the automatic ticket vending machine 90. As illustrated in FIG. 27, the automatic ticket vending machine 90 includes a CPU 901, a RAM 902, a storage device 903, a communication I/F 904, an input device 906, a display device 907, a medium reading device 908, an imaging device 909, an automatic change machine 912, and a printer 913. Each device is connected to a bus line 905.

The automatic change machine 912 automatically discharges money corresponding to the change amount calculated by the CPU 901 to the cash outlet when the total amount of money inputted to the cash inlet exceeds the payment amount for the purchase of goods or the use of services. The printer 913 prints a ticket, a receipt, a usage statement of a credit card, and the like, on a sheet in accordance with the control of the CPU 901.

The imaging device 909 includes a first imaging device 909a and a second imaging device 909b disposed at different heights, similar to the imaging device 209 in the first example embodiment. The imaging device 909 may be constituted by a single imaging device movable up and down, similar to the imaging device 209 in the first example embodiment.

Figure 28:
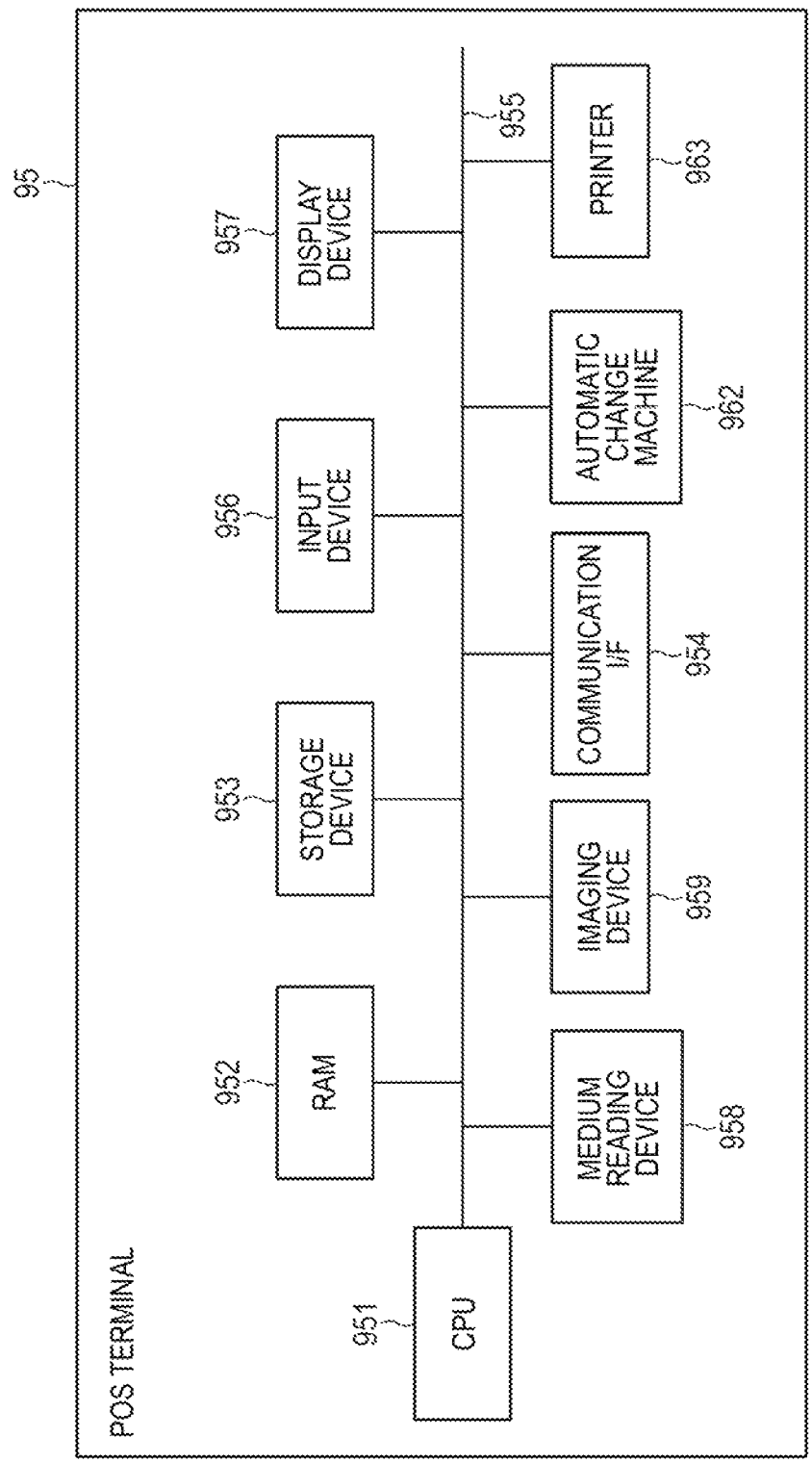
FIG. 28 is a block diagram illustrating an example of a hardware configuration of a POS terminal in the second example embodiment.

FIG. 28 is a block diagram illustrating an example of the hardware configuration of the POS terminal 95. The POS terminal 95 includes a CPU 951, a RAM 952, a storage device 953, a communication I/F 954, an input device 956, a display device 957, a medium reading device 958, an imaging device 959, an automatic change machine 962, and a printer 963. Each device is connected to a bus line 955.

Next, the operation of each apparatus in the information processing system 2 in the present example embodiment will be described with reference to FIG. 29 to FIG. 32. Since the control at the time of entry by the automated gate apparatus 50 is substantially the same as that of first example embodiment, the description thereof will be omitted.

[Registration Processing at the Time of Ticket Issuance]

Figure 29:
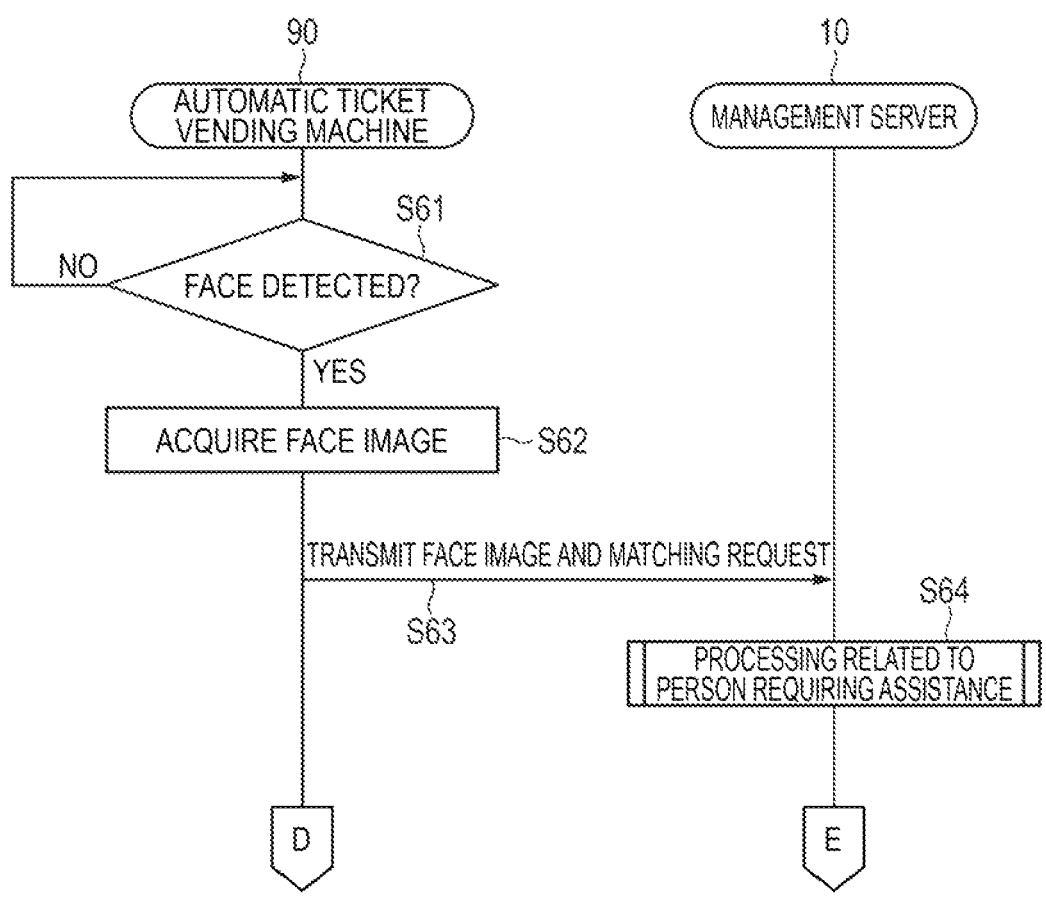
FIG. 29 is a sequence diagram (part 1) illustrating an example of the processing of the automatic ticket vending machine and the management server in the second example embodiment.
Figure 30:
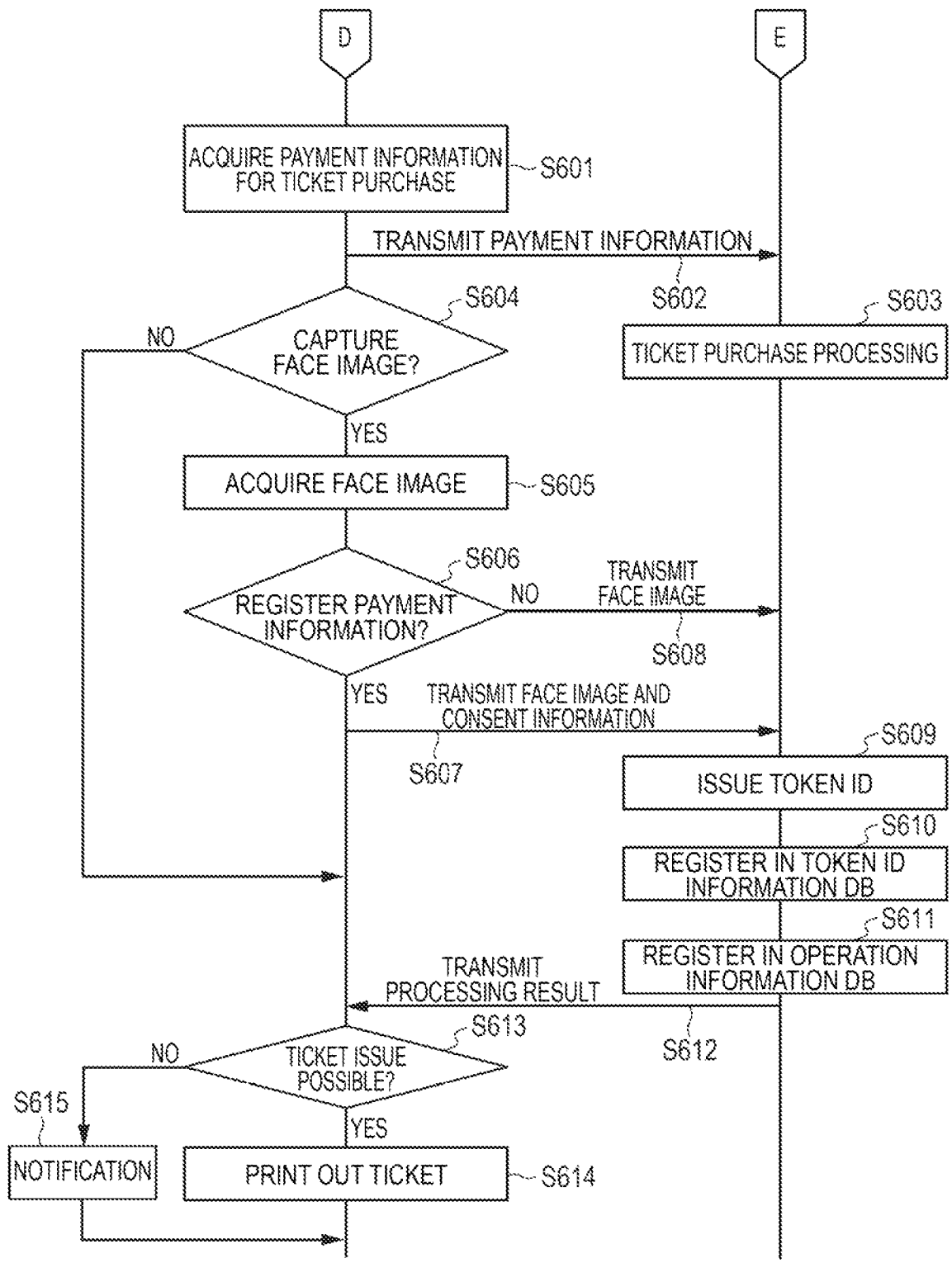
FIG. 30 is a sequence diagram (part 2) illustrating an example of the processing of the automatic ticket vending machine and the management server in the second example embodiment.

FIG. 29 and FIG. 30 are sequence diagrams illustrating an example of the processing of the automatic ticket vending machine 90 and the management server 10. This processing is executed when the user U purchases the ticket of the theme park TP at the automatic ticket vending machine 90.

As illustrated in FIG. 29, the automatic ticket vending machine 90 always or periodically captures the front of the automatic ticket vending machine 90 by the first imaging device 909a and the second imaging device 909b, and determines whether or not the face of the user U located in front of the automatic ticket vending machine 90 is detected in the captured image (step S61). The automatic ticket vending machine 90 waits until the face of the user U is detected in the image by the first imaging device 909a or the second imaging device 909b (step S61, NO).

When the automatic ticket vending machine 90 determines that the face of the user U is detected by the first imaging device 909a or the second imaging device 909b (step S61, YES), the automatic ticket vending machine captures the face of the user U by the first imaging device 909a or the second imaging device 909b detecting the face. Thus, the automatic ticket vending machine 90 acquires the face image of the user U as a target face image (step S62).

Next, the automatic ticket vending machine 90 transmits the target face image captured by the first imaging device 909a or the second imaging device 909b together with height information to the management server 10 via the network NW (step S63). Here, the height information is information relating to the height of the installation position of the imaging device which captured the target face image, specifically, information indicating that the first imaging device 909a installed at the lower position or the second imaging device 909b installed at the higher position captured the target face image. Note that, in the case of using the single imaging device that can move up and down, the height information is, for example, information indicating the capturing height of the imaging device when the face of the user U is captured. When transmitting the target face image, the automatic ticket vending machine 90 also transmits a terminal ID, which is an identifier uniquely identifying the automatic ticket vending machine 90, to the management server 10. The management server 10 can identify the position of the automatic ticket vending machine 90 based on the terminal ID of the automatic ticket vending machine 90.

Upon receiving the target face image and the height information from the automatic ticket vending machine 90, the management server 10 executes the process relating to the candidate for person requiring assistance for detecting the candidate for person requiring assistance, and the like in the same manner as in the case of the first example embodiment illustrated in FIG. 16 (step S64). In addition, the attendant terminal 25 executes processing related to the process relating to the candidate for person requiring assistance, as in the case of the first example embodiment illustrated in FIG. 18.

In this way, in the present example embodiment, a candidate for person requiring assistance is detected based on the capturing height of the imaging device which has captured the target face image of the user U, and in response to the notification of the alarm indicating the detection of the candidate for person requiring assistance to the attendant terminal 25, the attendant S confirms whether the candidate for person requiring assistance is a person requiring assistance. Also in the present example embodiment, since the candidate for person requiring assistance is detected and found based on the capturing height of the imaging device without requiring complicated image processing, the candidate for person requiring assistance can be efficiently found with high accuracy.

In the present example embodiment, as in the first example embodiment, the alarm notification destination is not limited to the attendant terminal 25, but may be, for example, a signage terminal, a user terminal, or the like.

The user U who is confirmed to be a person requiring assistance can subsequently perform the registration procedure at the automatic ticket vending machine 90 while receiving assistance according to the degree required by the attendant S. For the user U who is confirmed to be a person requiring assistance, the flag of person requiring assistance indicating that the user is a person requiring assistance is passed on to the subsequent settlement processing as part of the operation information. Therefore, in the settlement processing, the person requiring assistance can be easily specified from among the users U based on the flag of person requiring assistance, and assistance can be provided by the attendant S to the identified person requiring assistance.

As illustrated in FIG. 30, when the automatic ticket vending machine 90 acquires the payment information for the ticket purchase (step S601), the automatic ticket vending machine 90 transmits the payment information to the management server 10 (step S602).

Based on the received payment information, the management server 10 executes ticket purchase processing (settlement processing) with a server of a settlement system (not shown) (step S603).

On the other hand, the automatic ticket vending machine 90 determines whether or not the user U has consented to the capturing of the face image. If the automatic ticket vending machine 90 determines that the user U has consented (step S604, YES), the automatic ticket vending machine 90 acquires the face image of the user U captured by the imaging device 909 as a registered face image (step S605), and the processing proceeds to step S606. On the other hand, when the automatic ticket vending machine 90 determines that the user U has not consented (step S604, NO), the processing proceeds to step S613. Note that, since the automatic ticket vending machine 90 has acquired the target face image of the user U by the first imaging device 909*a* or the second imaging device 909*b* in step S62, the capturing in step S605 may be omitted.

In step S606, the automatic ticket vending machine 90 determines whether or not the user U has consented to the registration of the payment information. If the automatic ticket vending machine 90 determines that the user U has consented (step S606, YES), the automatic ticket vending machine 90 transmits the face image (registered face image) of the user U and the consent information to the management server 10 (step S607), and the processing proceeds to step S609. On the other hand, when the automatic ticket vending machine 90 determines that the user U has not consented (step S606, NO), the automatic ticket vending machine 90 transmits only the face image to the management server 10 (step S608), and the processing proceeds to step S609.

FIG. 31 illustrates an example of a screen displayed on the automatic ticket vending machine 90. Here, a description concerning capturing of a face image ("If you register your face image and further register your credit card information, you can use the payment service by face authentication in the park. Would you like to register your credit card information?") and a button for selecting whether or not to register the payment information are displayed.

In step S609, upon receiving the information from the automatic ticket vending machine 90, the management server 10 issues a token ID. Next, the management server 10 registers the relationship between the token ID and the registered face image in the token ID information DB 11 (step S610).

Next, the management server 10 registers the relationship between the token ID and the operation information (including the payment information) in the operation information DB 13 (step S611). Thus, the registered face image is associated with the operation information such as the payment information by the token ID. If there is no agreement on the association of the payment information, the association with the payment information is omitted. The valid period of the token ID in the present example embodiment is determined by the type of the ticket purchased (one-day ticket, annual passport, or the like). For example, in the case where the type of the ticket is a one-day ticket, the invalid flag of the token ID may be controlled to an invalid value ("0") at the end time of the business hour of the day on which entry is possible or at the time of exit from the theme park TP. That is, the management server 10 expires the valid period of the token ID based on the exit information of the user U from the area where the operations are executed.

When the assistance related information temporarily stored as in the case of the first example embodiment exists, the management server 10 sets the flag of person requiring assistance from "0" (person who does not require assistance) to "1" (person requiring assistance) as the operation information registered in the operation information DB 13 based on the assistance related information. The management server 10 registers the type of person requiring assistance such as a wheelchair, child, or the like as the operation information based on the assistance related information.

Next, the management server 10 transmits processing result information including the issued token ID to the automatic ticket vending machine 90 (step S612).

In step S613, the automatic ticket vending machine 90 determines whether or not a ticket can be issued. When the automatic ticket vending machine determines that the ticket can be issued (step S613, YES), the automatic ticket vending machine 90 prints out the ticket (step S614).

On the other hand, when the automatic ticket vending machine 90 determines that the ticket cannot be issued (step S613, NO), the automatic ticket vending machine 90 notifies that the ticket purchase processing has failed (step S615).

[Payment Processing by Face Authentication]

Figure 32:
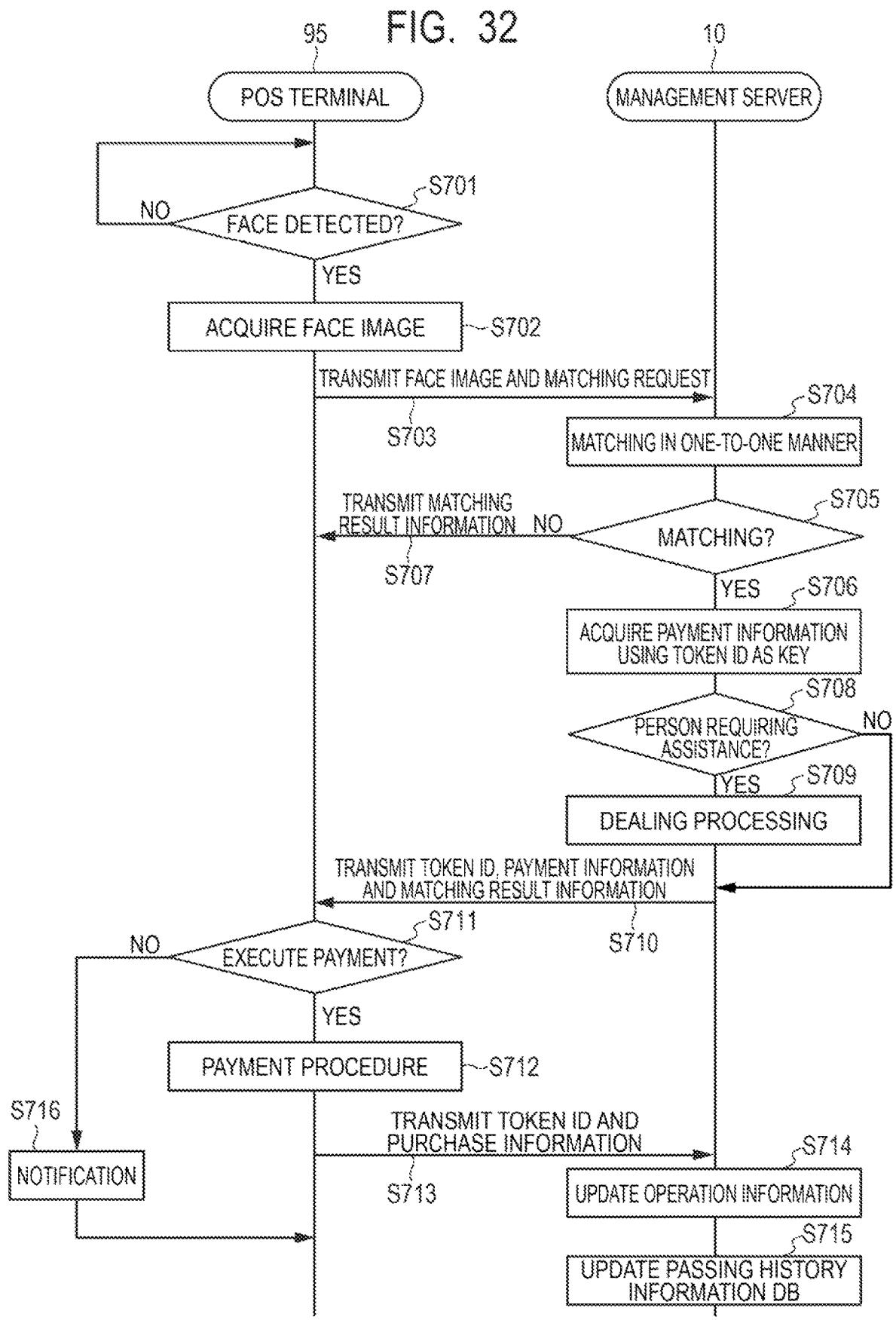
FIG. 32 is a sequence diagram illustrating an example of processing of the POS terminal and the management server in the second example embodiment.

FIG. 32 is a sequence diagram illustrating an example of the processing of the POS terminal 95 and the management server 10. This processing is executed when a payment method by the face authentication is designated by the user U at the time of purchasing a commodity or the like in the theme park TP.

First, the POS terminal 95 determines whether or not the face of the user U standing in front of the POS terminal 95 is detected in the image taken in front of the apparatus (step S701). The POS terminal 95 waits until the imaging device 959 detects the face of the user U in the image (step S701, NO).

When the POS terminal 95 determines that the face of the user U is detected by the imaging device 959 (step S701, YES), the POS terminal 95 captures the face of the user U and acquires the face image of the user U as a target face image (step S702).

Next, the POS terminal 95 transmits the target face image of the user U captured by the imaging device 959 to the management server 10 together with matching request via the network NW (step S703). Thus, the POS terminal 95 requests the management server 10 to match the target face image of the user U captured by the imaging device 959 and the plurality of registered face images registered in the token ID information DB 11 of the management server 10 in a 1:N manner.

Upon receiving the target face image and the matching request from the POS terminal 95, the management server 10 performs matching of the face image of the user U (step S704). That is, the management server 10 matches the target face image received from the POS terminal 95 and the plurality of registered face images registered in the token ID information DB 11 in a 1:N manner. The registered face image to be matching destination is limited to the image associated with the token ID in which the value of the invalid flag is "1" (valid).

If the management server 10 determines that the matching result is mismatching (step S705, NO), the management server 10 transmits matching result information indicating the mismatching to the POS terminal 95 (step S707), and the processing proceeds to step S711. On the other hand, when the management server 10 determines that the matching result is matching (step S705, YES), the processing proceeds to step S706.

In step S706, the management server 10 acquires the payment information included in the operation information from the operation information DB 13 using the token ID associated with the registered face image of the matching as a key.

Next, the management server 10 determines whether or not the user U is a person requiring assistance, as in the case of the first example embodiment, based on the flag of person requiring assistance included in the acquired operation information (step S708). Thus, the management server 10 can easily identify the person requiring assistance from among the users U receiving the settlement processing based on the flag of person requiring assistance.

When the management server 10 determines that the user U is not a person requiring assistance (step S708, NO), the management server 10 proceeds to the next step as it is. On the other hand, when the management server 10 determines that the user U is a person requiring assistance (step S708, YES), the management server 10 executes processing for dealing with the person requiring assistance (step S709), and proceeds to the next step. The management server 10 can, for example, notify an alarm indicating that the user U is a person requiring assistance to an attendant terminal 25 carried by the attendant S engaged in selling goods or the like, the attendant S engaged in dealing with person requiring assistance, or the like. At this time, the management server 10 can notify the type of person requiring assistance included in the operation information together with the alarm.

Next, the management server 10 transmits the matching result information, the token ID, and the payment information to the POS terminal 95 (step S710). Note that the management server 10 can execute the step S710 and the steps S708 and S709 described above regardless of the sequence, and can also execute them in parallel.

Next, when the POS terminal 95 determines that the settlement processing can be executed based on the matching result information and the payment information acquired from the management server 10 (step S711, YES), the POS terminal 95 executes the settlement processing of the user U based on the payment information (step S712).

Next, the POS terminal 95 transmits the token ID and the purchase information such as the goods to the management server 10 via the network NW (step S713).

Upon receiving the information from the POS terminal 95, the management server 10 updates the operation information DB 13 and the passing history information DB 12 (step S714 and step S715).

On the other hand, when the POS terminal 95 determines that the settlement processing cannot be executed based on the matching result information and the payment information (step S711, NO), the POS terminal 95 notifies the user U of an error message (step S716).

Thus, according to the present example embodiment, by associating the face image and the payment information with the token ID at the time of the purchase of the ticket, the settlement processing by the face authentication becomes possible during the period when the token ID is valid.

Third Example Embodiment

Figure 33:
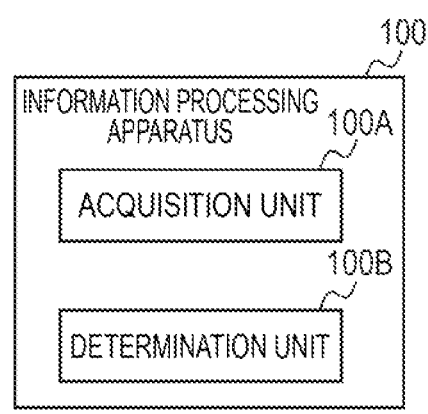
FIG. 33 is a block diagram illustrating an example of the overall configuration of an information processing apparatus in the third example embodiment.

FIG. 33 is a block diagram illustrating an example of the overall configuration of an information processing apparatus 100 in the present example embodiment. The information processing apparatus 100 includes an acquisition unit 100A that acquires height information relating to a height of a capturing position of an imaging device that captured an image in which a face of a user was detected, and a determination unit 100B that determines, based on the height information, whether or not the user is a candidate for person requiring assistance, who may be a person requiring assistance. According to the information processing apparatus 100 in the present example embodiment, the candidate for person requiring assistance can be efficiently found with high accuracy.

Modified Example Embodiments

Although the present invention has been described above with reference to the example embodiments, the present invention is not limited to the example embodiments as described above. The configurations and the details of the present invention may be varied in such a way as to be understood by those skilled in the art without departing from the spirit of the present invention. For example, it is to be understood that an example embodiment in which a part of the configuration of any one of the example embodiments is added to another of the example embodiments, or an example embodiment in which a part of the configuration of any one of the example embodiments is replaced with a part of the configuration of another of the example embodiments is also an example embodiment to which the present invention may be applied.

In the first example embodiment described above, the case where a candidate for person requiring assistance is detected based on the height information of the imaging device which has captured the face image in the check-in terminal 20 has been described, but the present invention is not limited to this case. The automated baggage drop machine 30, the security inspection apparatus 40, the automated gate apparatus 50, and the boarding gate apparatus 60 are each configured in the same manner as the check-in terminal 20, and a candidate for person requiring assistance can be detected in the same manner as the check-in terminal 20.

In the first and second example embodiments described above, the case where the present invention is applied to the operations of the airport facility and the theme park has been described. However, in the present invention, the control data necessary for the face authentication and the operation information necessary for the execution of the operations are managed in the separate databases, and the registered face image and the operation information are related by the token ID. The configuration of the present invention, in which the token ID and the operation information of the existing operation system can be easily associated with each other, can be applied to operations in any business, such as the railway business, the accommodation business, the service business, and the manufacturing business. For example, when applied to the operations of the accommodation business, by associating the face image of a guest with the operation information by the token ID at the time of check-in to a hotel, the purchase of the goods in the facility, the use of the service, the control of entering and leaving the guest room, and the like can be performed by face authentication during the stay period of the user.

Further, in the case of using the configuration of the present invention for the railway business, when a face image is captured when a ticket or a limited express ticket is purchased by a portable terminal or a ticket vending machine of a window, the management server 10 can issue a token ID when registering the face image to the management server 10. Thus, the user U can enter the station premises by face authentication using an automatic ticket gate and get on a prescribed train. In addition, in the case where ticket inspection is performed by a conductor in a train, the conductor may capture a face image of the user U using a portable operation terminal and upload the face image to the management server 10 via the network NW. Thus, the ticket inspection operation based on the face authentication can be performed in the train. Note that the ticket inspection may be performed automatically by the management server 10 based on an image taken by a network camera installed in the car of the train. When the user U gets off at the destination station, the user U can leave the station by face recognition at the automatic ticket gate of the station from which the user U gets off, just as when the user U enters the station. If the token ID and the payment information are previously associated with each other, the user can pay the fare by face authentication. Thus, according to the present invention, there is an advantage that the function of face authentication can be easily implemented in the existing business system.

In the first, second and modified example embodiments described above, the management server 10 controls the life cycle of the token ID to be synchronized with the life cycle of the operation information, but the control may be asynchronous. Here, the description will be given as an example of the operations of an airline company. First, when a user U performs procedures for becoming a member (hereinafter referred to as "mileage member") of the airline company, the management server 10 issues a token ID by triggering the reception of a face image from the user terminal such as a smartphone, and registers the relationship between the face image of the user U and the token ID in a token ID information DB 11. Further, the management server 10 registers the relationship between the issued token ID and the operation information in the operation information DB 13 at the timing when the user U has reserved or purchased the boarding pass, for example. During the period when the user U is a mileage member, the management server 10 maintains the value of the invalid flag of the token ID as valid ("1"). Thus, the valid period of the token ID is not affected by the progress (start and end) of the operations. That is, unlike the case of the first example embodiment, even if the user U passes through the boarding gate, the token ID is not invalidated. For this reason, while the user U is registered as the member, the user U can perform various procedures (a check-in procedure, a boarding procedure, and the like) at the airport A by face authentication. As a result, the convenience of the user U can be improved.

Figure 34:
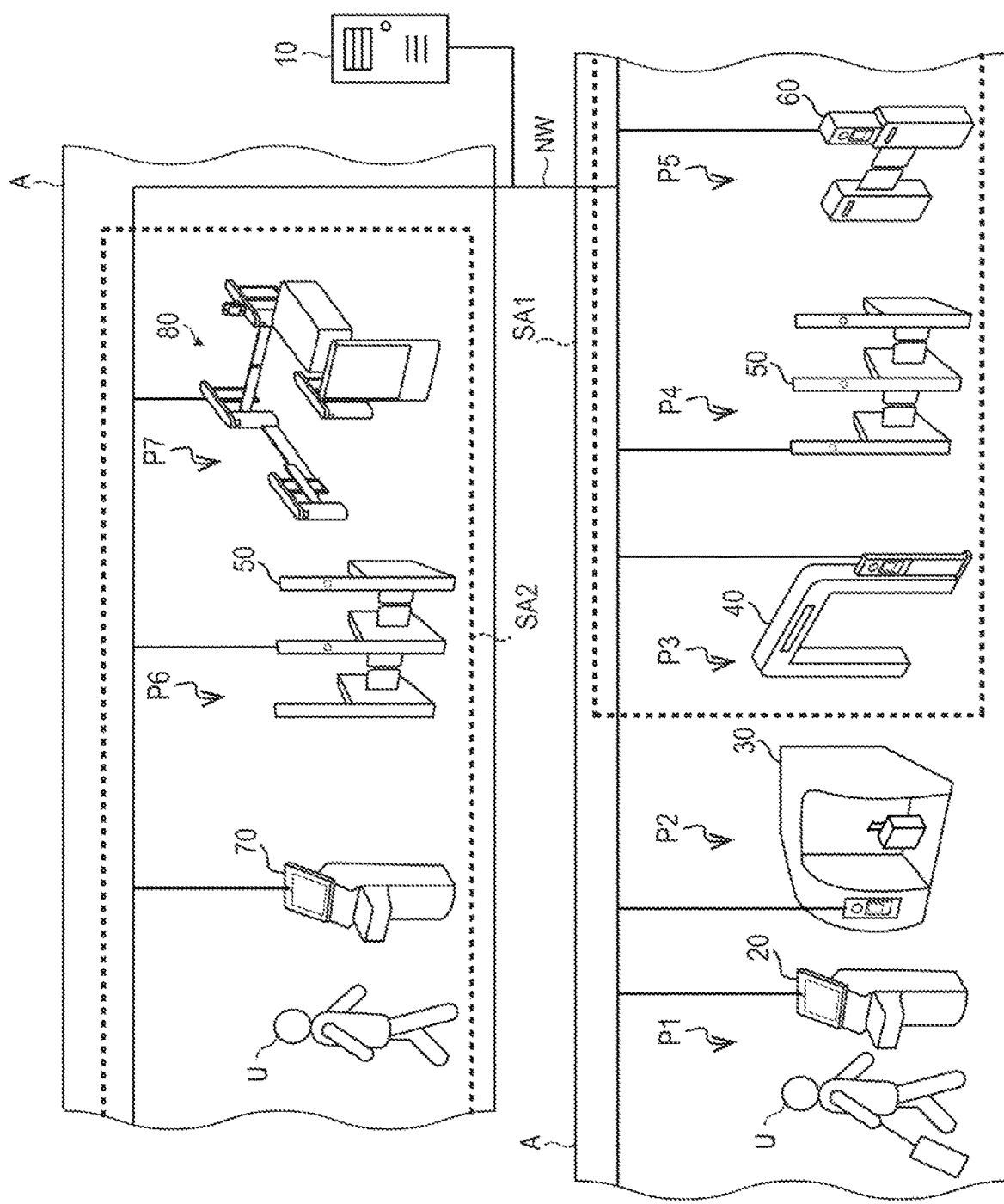
FIG. 34 is a block diagram illustrating an example of the overall configuration of an information processing system in a modified example embodiment.

In the first example embodiment described above, the life cycle from the issuance of the token ID to the invalidation of the token ID at the time of departure of the user U has been described, but the configuration of the present invention can be applied to operations such as immigration examination procedures and customs procedures at the time of entry. FIG. 34 is a block diagram illustrating an example of the overall configuration of an information processing system 3 in the modified example embodiment. Here, an ID issuing terminal 70 of the token ID, the automated gate apparatus 50, and an automated customs gate apparatus 80 are arranged in the security area SA2 indicated by the broken line at the time of entry.

For example, if the ID issuing terminal 70 makes an application for issuing the token ID by reading the passport face image and capturing a face image of the user U in the same manner as in the case of the check-in terminal 20, the subsequent procedures (an immigration examination procedure and a customs procedure) in the automated gate apparatus 50 and the automated customs gate apparatus 80 can be executed by face authentication. The application for issuing the token ID at the time of the entry is not limited to the ID issuing terminal 70, but may be made from the automated gate apparatus 50 and the automated customs gate apparatus 80. That is, the management server 10 may acquire a passport face image and a target biometric image from any one of the operation terminals for executing the operations relating to the entry of the user U. In the case where the token ID is issued at the time of the entry, there is an advantage that an initial procedure (check-in procedure, or the like) at the time of return (departure) can also be performed by face recognition. The ID issuing terminal 70, the automated gate apparatus 50, and the automated customs gate apparatus 80 are each configured in the same manner as the check-in terminal 20, and a candidate for person requiring assistance can be detected in the same manner as the check-in terminal 20.

The configuration of the present invention is applicable not only to international flights but also to domestic flights. In the case of domestic flights, one-to-one matching processing of a passport face image and a captured face image as well as the departure examination procedure may be omitted. In this case, for example, the captured face image at the time of purchase of the boarding pass may be registered as the registered biological image. When purchasing or checking in a boarding pass online using a terminal such as a smartphone or a personal computer, if a face image captured by the terminal is registered, it is possible to board an aircraft by face authentication at the airport A.

In the first example embodiment described above, the check-in terminal 20 has applied for issuance of the token ID to the management server 10 by reading the passport face image from the passport, but it is preferable that the automated baggage drop machine 30 or the security inspection apparatus 40 apples for issuance of the token ID in consideration of a case when a check-in procedure is made online. That is, the management server 10 acquires a passport face image and a target biometric image from any one of the operation terminals for executing the operations concerning the departure of the user U. In addition, an application for issuance of the token ID may be made in the first procedural operation among a series of procedural operations performed at the time of departure.

In addition, when the airport facilities of the departure place (the first country) and the destination (the second country) share the management server 10, the token ID is issued by the check-in procedure in the first country, and the operation information associated with the token ID can be easily used by face authentication in the immigration examination and the customs examination in the second country.

In the first, second and modified example embodiments described above, for example, the first imaging device 209a and the second imaging device 209b having different heights from each other from the floor surface to the installation position are used as the imaging device. However, for example, even if the height from the floor surface to the installation position is the same, that is, the imaging device 209d (the capturing range H4 in the vertical direction) (not shown) and the imaging device 209e (the capturing range H5 in the vertical direction) (not shown) are installed horizontally, the height of the capturing range H4 and the height of the capturing range H5 can be made different by inclining the imaging device 209e downward so that the height of the capturing range H4 is higher than the height of the capturing range H5 (for example, the height from the floor surface to the lower end of the capturing range H4 is higher than the height from the floor surface to the lower end of the capturing range H5). In this case, acquiring the identification information of the imaging device 209d or 209e includes acquiring the height information.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above, can be described as, but not limited to, the following supplementary notes.

Supplementary Note 1

An information processing apparatus comprising:
an acquisition unit that acquires height information relating to a height of a capturing position of an imaging device that captured an image in which a face of a user was detected; and
a determination unit that determines, based on the height information, whether or not the user is a candidate for person requiring assistance, who may be a person requiring assistance.

Supplementary Note 2

The information processing apparatus according to supplementary note 1,
wherein the determination unit determines that the user is the candidate for person requiring assistance when the height of the capturing position of the imaging device is a predetermined height or less.

Supplementary Note 3

The information processing apparatus according to supplementary note 2,
wherein the imaging device includes a first imaging device and a second imaging device installed at a higher position than the first imaging device, and
wherein the determination unit determines that the user is the candidate for person requiring assistance when the image was captured by the first imaging device.

Supplementary Note 4

The information processing apparatus according to supplementary note 2,
wherein the imaging device can move up and down to change the height, and
wherein the determination unit determines that the user is the candidate for person requiring assistance when the imaging device captured the image at the height equal to or lower than a predetermined height.

Supplementary Note 5

The information processing apparatus according to any one of supplementary notes 1 to 4, comprising:
a notification unit that notifies a notification destination of an alarm indicating that the candidate for person requiring assistance is detected when the user is determined to be the candidate for person requiring assistance.

Supplementary Note 6

The information processing apparatus according to supplementary note 5,
wherein the notification unit notifies the alarm to the notification destination having a predetermined positional relationship with a position at which the candidate for person requiring assistance is detected.

Supplementary Note 7

The information processing apparatus according to supplementary note 6,
wherein the notification unit notifies the alarm to the notification destination located within a predetermined distance range from the position at which the candidate for person requiring assistance is detected.

Supplementary Note 8

The information processing apparatus according to any one of supplementary notes 5 to 7,
wherein the notification destination is an attendant terminal used by an attendant, a signage terminal, or a user terminal used by the user.

Supplementary Note 9

The information processing apparatus according to any one of supplementary notes 5 to 8,
wherein the notification unit stops the alarm upon receiving information indicating that it is being confirmed whether or not the candidate for person requiring assistance is a person requiring assistance.

Supplementary Note 10

The information processing apparatus according to any one of supplementary notes 1 to 9, comprising:
a registration unit that registers information about the user when the user is determined to be the candidate for person requiring assistance.

Supplementary Note 11

The information processing apparatus according to supplementary note 10,
wherein when the registration unit receives information indicating that confirmation of whether or not the candidate for person requiring assistance is a person requiring assistance is completed, the registration unit deletes the information about the user.

Supplementary Note 12

The information processing apparatus according to any one of supplementary notes 1 to 11, comprising:
an issuing unit that issues an identifier associating a registered biometric information of the user with operation information related to a predetermined operation,
wherein the operation information includes information indicating whether or not the user is a candidate for person requiring assistance.

Supplementary Note 13

The information processing apparatus according to any one of supplementary notes 1 to 12,
wherein the candidate for person requiring assistance is a wheelchair user or a child in a predetermined age range.

Supplementary Note 14

An information processing method comprising:
acquiring height information relating to a height of a capturing position of an imaging device that captured an image in which a face of a user was detected; and
determining, based on the height information, whether or not the user is a candidate for person requiring assistance, who may be a person requiring assistance.

Supplementary Note 15

A storage medium storing a program that causes a computer to perform:
acquiring height information relating to a height of a capturing position of an imaging device that captured an image in which a face of a user was detected; and
determining, based on the height information, whether or not the user is a candidate for person requiring assistance, who may be a person requiring assistance.

As described above, although the present invention has been described with reference to the example embodiments, the present invention is not limited to the example embodiments described above. Various modifications that may be understood by those skilled in the art can be made to the configuration or details of the present invention within the scope of the present invention.

REFERENCE SIGNS LIST

NW . . . network
1, 2, 3 . . . information processing system
10 . . . management server
11 . . . token ID information DB
12 . . . passing history information DB
13 . . . operation information DB
14 . . . attendant terminal information DB
15 . . . candidate for person requiring assistance DB
20 . . . check-in terminal
25 . . . attendant terminal
30 . . . automated baggage checker
40 . . . security inspection apparatus
50 . . . automated gate apparatus
60 . . . boarding gate apparatus
70 . . . ID issuing terminal
80 . . . automated customs gate apparatus
90 . . . automatic ticket vending machine
95 . . . POS terminal
100 . . . information processing apparatus

What is claimed is:
1. An information processing apparatus comprising:
a memory configured to store instructions; and
a processor configured to execute the instructions to:
acquire height information relating to a height of a capturing position of an imaging device that captured an image in which a face of a user was detected;
determine, based on the height information, whether or not the user is a candidate for person requiring assistance, who may be a person requiring assistance; and perform a matching operation to match the face of the user in the image with a plurality of registered face images registered in database in a 1:N manner.

2. The information processing apparatus according to claim 1, wherein the processor is further configured to execute the instructions to:
determine that the user is the candidate for person requiring assistance when the height of the capturing position of the imaging device is a predetermined height or less.

3. The information processing apparatus according to claim 2,
wherein the imaging device includes a first imaging device and a second imaging device installed at a higher position than the first imaging device, and
wherein the processor is further configured to execute the instructions to:
determine that the user is the candidate for person requiring assistance when the image was captured by the first imaging device.

4. The information processing apparatus according to claim 2,
wherein the imaging device can move up and down to change the height, and
wherein the processor is further configured to execute the instructions to:
determine that the user is the candidate for person requiring assistance when the imaging device captured the image at the height equal to or lower than a predetermined height.

5. The information processing apparatus according to claim 1, wherein the processor is further configured to execute the instructions to:
notify a notification destination of an alarm indicating that the candidate for person requiring assistance is detected when the user is determined to be the candidate for person requiring assistance.

6. The information processing apparatus according to claim 5, wherein the processor is further configured to execute the instructions to:
notify the alarm to the notification destination having a predetermined positional relationship with a position at which the candidate for person requiring assistance is detected.

7. The information processing apparatus according to claim 6, wherein the processor is further configured to execute the instructions to:
notify the alarm to the notification destination located within a predetermined distance range from the position at which the candidate for person requiring assistance is detected.

8. The information processing apparatus according to claim 5,
wherein the notification destination is an attendant terminal used by an attendant, a signage terminal, or a user terminal used by the user.

9. The information processing apparatus according to claim 5, wherein the processor is further configured to execute the instructions to:
stop the alarm upon receiving information indicating that it is being confirmed whether or not the candidate for person requiring assistance is a person requiring assistance.

10. The information processing apparatus according to claim 1, wherein the processor is further configured to execute the instructions to:
register information about the user when the user is determined to be the candidate for person requiring assistance.

11. The information processing apparatus according to claim 10, wherein the processor is further configured to execute the instructions to:
when receiving information indicating that confirmation of whether or not the candidate for person requiring assistance is a person requiring assistance is completed, delete the information about the user.

12. The information processing apparatus according to claim 1, wherein the processor is further configured to execute the instructions to:
issue an identifier associating a registered biometric information of the user with operation information related to a predetermined operation,
wherein the operation information includes information indicating whether or not the user is a candidate for person requiring assistance.

13. The information processing apparatus according to claim 1,
wherein the candidate for person requiring assistance is a wheelchair user or a child in a predetermined age range.

14. An information processing method comprising:
acquiring height information relating to a height of a capturing position of an imaging device that captured an image in which a face of a user was detected;
determining, based on the height information, whether or not the user is a candidate for person requiring assistance, who may be a person requiring assistance; and
performing a matching operation to match the face of the user in the image with a plurality of registered face images registered in database in a 1:N manner.

15. A non-transitory storage medium storing a program that causes a computer to perform:
acquiring height information relating to a height of a capturing position of an imaging device that captured an image in which a face of a user was detected;
determining, based on the height information, whether or not the user is a candidate for person requiring assistance, who may be a person requiring assistance; and
performing a matching operation to match the face of the user in the image with a plurality of registered face images registered in database in a 1:N manner.

* * * * *